United States Patent
Lefeld et al.

(10) Patent No.: US 12,466,713 B1
(45) Date of Patent: Nov. 11, 2025

(54) INDUSTRIAL MATERIALS HANDLING VEHICLE COMPRISING A SENSOR ACCOMMODATING BUMPER MOUNT

(71) Applicant: Crown Equipment Corporation, New Bremen, OH (US)

(72) Inventors: Chad M. Lefeld, Coldwater, OH (US); Adam Homan, Minster, OH (US); Patrick Wenning, Sidney, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 18/940,247

(22) Filed: Nov. 7, 2024

(51) Int. Cl.
*B66F 9/075* (2006.01)
*G01S 7/481* (2006.01)

(52) U.S. Cl.
CPC ........ *B66F 9/07568* (2013.01); *B66F 9/0755* (2013.01); *B66F 9/07586* (2013.01); *G01S 7/4813* (2013.01)

(58) Field of Classification Search
CPC .......................... B66F 9/0755; B66F 9/07568; B66F 9/07586; B66F 9/075; B66F 11/00; B66F 9/063; B66F 17/003; G01S 7/4813; G01S 7/00; G01S 7/48; G01S 7/481; G01S 7/4811; G01S 17/00; G01S 17/88; G01S 17/89; G01S 17/93; G01S 17/931
USPC ............................................. 180/211, 21, 210
See application file for complete search history.

(56) References Cited

U.S. PATENT DOCUMENTS

| | | | | |
|---|---|---|---|---|
| 6,050,770 | A * | 4/2000 | Avitan | B66F 17/003 |
| | | | | 212/277 |
| 10,850,759 | B2 * | 12/2020 | Loveless | B62B 5/0006 |
| 10,875,481 | B2 | 12/2020 | Kishi | |
| 11,453,355 | B2 | 9/2022 | Tracy et al. | |
| 2011/0166721 | A1 * | 7/2011 | Castaneda | G05D 1/0255 |
| | | | | 701/2 |
| 2019/0351857 | A1 * | 11/2019 | Kishi | G01S 17/931 |
| 2020/0317148 | A1 * | 10/2020 | Tracy | B60R 19/023 |

(Continued)

FOREIGN PATENT DOCUMENTS

| | | | | |
|---|---|---|---|---|
| AU | 2014277717 A1 * | 1/2015 | | |
| EP | 0800129 A1 * | 10/1997 | | B66F 9/0755 |
| EP | 3772483 A1 * | 2/2021 | | B66F 17/003 |

*Primary Examiner* — Jason D Shanske
*Assistant Examiner* — Daniel M. Keck
(74) *Attorney, Agent, or Firm* — Dinsmore & Shohl LLP

(57) ABSTRACT

An industrial materials handling vehicle including a vehicle body supported by steer wheel and wheel assemblies, a bumper coupled to the body, and a sensor accommodating bumper mount mounted to the vehicle body and/or bumper, the body and the bumper cooperatively defining a steer wheel access opening. The sensor accommodating bumper mount comprises a bumper mount housing with complementary steer wheel access opening, a sensor assembly mount removably mounted to the bumper and/or bumper mount housing, and a sensor assembly mounted to the sensor assembly mount. The sensor assembly and mount at least partially obstruct the steer wheel access opening and complementary steer wheel access opening when the sensor assembly mount is mounted to the bumper and/or bumper mount housing, providing at least partial access to the steer wheel assembly through the steer wheel access opening and the complementary steer wheel access opening when the sensor assembly mount is unmounted.

33 Claims, 10 Drawing Sheets

(56) References Cited

U.S. PATENT DOCUMENTS

| | | | | |
|---|---|---|---|---|
| 2021/0061629 A1* | 3/2021 | Ogawa | ................. | B60W 30/08 |
| 2023/0382704 A1* | 11/2023 | Akatsuka | .............. | B66F 17/003 |
| 2023/0399212 A1* | 12/2023 | Bangalore Srinivas | .. | B66F 9/12 |

* cited by examiner

INDUSTRIAL MATERIALS HANDLING VEHICLE COMPRISING A SENSOR ACCOMMODATING BUMPER MOUNT

BACKGROUND

The present disclosure relates to industrial materials handling vehicles and, more particularly, to materials handling vehicles that incorporate sensor technology in their functionality.

BRIEF SUMMARY

According to the subject matter of the present disclosure, an industrial materials handling vehicle is provided comprising a sensor accommodating bumper mount that is removably mounted to the vehicle.

In accordance with one embodiment of the present disclosure, an industrial materials handling vehicle is provided. The materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a bumper mount housing that may comprise a complementary steer wheel access opening, and a sensor assembly mount removably mounted to the bumper, the bumper mount housing, or both. The sensor accommodating bumper mount may further comprise a sensor assembly mounted to the sensor assembly mount, wherein the sensor assembly and the sensor assembly mount at least partially obstruct the steer wheel access opening and the complementary steer wheel access opening when the sensor assembly mount is mounted to the bumper, the bumper mount housing, or both, and provide at least partial access to the steer wheel assembly through the steer wheel access opening and the complementary steer wheel access opening when the sensor assembly mount is unmounted.

The steer wheel access opening and the complementary steer wheel access opening may define an unobstructed path to a majority of a wheel face of the steer wheel assembly upon removal of the sensor assembly mount.

The sensor assembly and the sensor assembly mount may form an integrated sensor assembly unit that are removable together from the materials handling vehicle by removing the sensor assembly mount.

The sensor assembly mount may comprise a sensor assembly mounting base, a sensor assembly mounting plate mounted to the sensor assembly mounting base, and sensor assembly mounting hardware removably securing the sensor assembly to the sensor assembly mounting plate.

The sensor assembly mount may further comprise a supplemental bumper plate mounted to the sensor assembly mounting base.

The supplemental bumper plate may extend outwardly from the sensor assembly mounting plate in a corresponding sloped manner to follow the contour of the bumper mount housing.

The materials handling vehicle may further comprise a sensor assembly cover mounted to the bumper mount housing.

The materials handling vehicle may further comprise a removable sensor assembly cover mounted to the bumper mount housing, and the sensor assembly mount comprises a supplemental bumper plate. The sensor assembly cover and the supplemental bumper plate may cooperate to define a sensor window aligned with a sensing portion of the sensor assembly.

The sensor assembly may comprise a LiDAR sensor.

The sensor window may define a field of view that is greater than or equal to 170 degrees and less than or equal to 210 degrees in a horizontal plane, with the vehicle supported by the wheel assemblies on a horizontal operating surface.

The bumper mount housing may comprise a deflection cap that is sloped downwardly with the vehicle supported by the wheel assemblies on a horizontal operating surface.

The bumper mount housing may further comprise side walls that extend outwardly from the vehicle body in a sloped manner to define an outwardly contracting housing volume.

The sensor assembly mount comprises a supplemental bumper plate that extends outwardly relative to the vehicle body in alignment with the bumper mount housing side walls.

The bumper mount housing may be mounted to the vehicle body and the sensor assembly mount is mounted to the bumper mount housing.

The sensor assembly mounting plate of the sensor assembly mount may be mounted to the bumper mount housing.

The sensor assembly mount may comprise mounting hardware passages that are aligned with complementary mounting hardware passages in the bumper mount housing. The sensor assembly mount may further comprise mounting hardware that extends through mounting hardware passages of the sensor assembly mount and extends through or engages the complementary mounting hardware passages of the bumper mount housing to removably secure the sensor assembly mount to the bumper mount housing.

The materials handling vehicle may further comprise a removable sensor assembly cover mounted to the bumper mount housing, and a sensor assembly mount. The sensor assembly mount may comprise a sensor assembly mounting base, a sensor assembly mounting plate mounted to the sensor assembly mounting base, sensor assembly mounting hardware removably securing the sensor assembly to the sensor assembly mounting plate, and a supplemental bumper plate mounted to the sensor assembly mounting base. The sensor assembly cover and the supplemental bumper plate may cooperate to define a sensor window aligned with a sensing portion of the sensor assembly.

The steer wheel access opening and the complementary steer wheel access opening may define an unobstructed path to a majority of a wheel face of the steer wheel assembly upon removal of the sensor assembly mount.

The sensor assembly may comprise a LiDAR sensor and the sensor window defines a field of view that is greater than or equal to 170 degrees and less than or equal to 210 degrees in a horizontal plane, with the vehicle supported by the wheel assemblies on a horizontal operating surface.

The sensor assembly mount may further comprise one or more adjustment features to selectively position the sensor assembly relative to the sensor assembly mount.

Each adjustment feature may independently control the rotation of the sensor assembly about a principal axis comprising a pitch axis, a roll axis, and a yaw axis.

Each adjustment feature may comprise one or more adjustable screws or tabs positioned on the sensor assembly mount to rotate the sensor assembly about one or more principal axes.

The sensor assembly mount may comprise one more damping mechanisms positioned between the sensor and the sensor assembly mount.

A plurality of damping mechanisms may be positioned between the sensor assembly and the sensor assembly mount, wherein the plurality of damping mechanisms contact an upper surface of the sensor assembly and contact a lower surface of the sensor assembly mount.

One or more damping mechanisms may comprise one or more of helical springs, leaf springs, isolation pads, and plungers.

The sensor assembly mount may comprise four independent damping mechanisms positioned between the sensor and the sensor assembly mount.

The one or more damping mechanisms may be capable of substantially isolating the sensor assembly from vibrations at an impact of less than or equal to 40G.

The sensor assembly mount may further comprise an angle bracket coupling the sensor assembly mount to the bumper mount housing.

The angle bracket may be configured to enable the sensor assembly mount to swing out horizontally about an attachment point.

The angle bracket may be configured to enable the sensor assembly mount to swing out vertically about an attachment point.

The angle bracket may further comprise at least one movement channel, wherein the angle bracket is fixed to the sensor assembly mount at a first side and the angle bracket is selectively coupled to the bumper mount housing within the at least one movement channel at a second side via at least one attachment screw positioned within the at least one movement channel, and wherein loosening the at least one attachment screw enables the angle bracket to move according to dimensions of the at least one movement channel.

The angle bracket may be a fixed structure without moveable joints.

In accordance with one embodiment of the present disclosure, an inustrial materials handling vehicle is provided. The materials handling vehicle may comprise a vehicle body supported by a plurality of wheel assemblies, and a sensor accommodating bumper mount mounted to the vehicle body. The vehicle body may define a wheel access opening. The sensor accommodating bumper mount may comprise a bumper mount housing comprising a complementary wheel access opening, and a sensor assembly mount removably mounted to the vehicle body, the bumper mount housing, or both. The sensor accommodating bumper mount may further comprise a sensor assembly mounted to the sensor assembly mount, wherein the sensor assembly and the sensor assembly mount at least partially obstruct the wheel access opening and the complementary wheel access opening when the sensor assembly mount is mounted to the vehicle body, the bumper mount housing, or both, and provide at least partial access to the steer wheel assembly through the wheel access opening and the complementary wheel access opening when the sensor assembly mount is unmounted.

In accordance with one embodiment, there is provided an industrial materials handling vehicle. The materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may further comprise a bumper mount housing coupled to a body panel of the vehicle body, the bumper mount housing comprising a complementary steer wheel access opening, and a sensor assembly mount removably mounted to the body panel of the vehicle body, the bumper mount housing, or both. The sensor accommodating bumper mount may also comprise a sensor assembly that may be movably mounted to the sensor assembly mount. The sensor assembly and the sensor assembly mount may be positioned above the steer wheel access opening and the complementary steer wheel access opening relative to a horizontal operating plane defined by the materials handling vehicle when the sensor assembly mount is mounted to the body panel of the vehicle body, the bumper mount housing, or both, to provide unobstructed access to the steer wheel assembly through the steer wheel access opening and the complementary steer wheel access opening.

The sensor assembly mount may comprise an angle bracket, a sensor assembly mounting plate mounted to the angle bracket, and sensor assembly mounting hardware removably securing the sensor assembly to the angle bracket.

The angle bracket may be configured to enable the sensor assembly mount to swing out horizontally about an attachment point.

The angle bracket may be configured to enable the sensor assembly mount to swing out vertically about an attachment point.

The angle bracket may further comprise at least one movement channel, and may be fixed to the sensor assembly mount at a first side. The angle bracket may be selectively coupled to the bumper mount housing within the at least one movement channel at a second side via at least one attachment screw positioned within the at least one movement channel. Loosening the at least one attachment screw enables the angle bracket to move according to dimensions of the at least one movement channel.

The materials handling vehicle may further comprise a sensor assembly cover mounted to the bumper mount housing.

The materials handling vehicle may further comprise at least one removable sensor assembly cover mounted to the bumper mount housing, and a sensor window aligned with a sensing portion of the sensor assembly defined by the at least one removable sensor assembly cover.

The sensor assembly comprises a LiDAR sensor.

The sensor window may define a field of view that is greater than or equal to 170 degrees and less than or equal to 210 degrees in a horizontal plane, with the vehicle support by the wheel assemblies on a horizontal operating surface.

The bumper mount housing comprise a deflection cap that is sloped downwardly towards the horizontal operating plane of the vehicle.

The bumper mount housing may comprise side walls that extend outwardly from the vehicle body in a sloped manner to define an outwardly contracting housing volume.

The bumper mount housing may be mounted to the vehicle body and the sensor assembly mount is mounted to the bumper mount housing.

The angle bracket of the sensor assembly mount may be mounted to the bumper mount housing.

The sensor assembly mount may comprise mounting hardware passages that are aligned with complementary mounting hardware passages in the bumper mount housing. The sensor assembly mount may further comprise mounting hardware that extends through mounting hardware passages of the sensor assembly mount and extends through or engages the complementary mounting hardware passages of the bumper mount housing to removably secure the sensor assembly mount to the bumper mount housing.

The sensor assembly mount may comprise one or more damping mechanisms positioned between the sensor and the sensor assembly mount.

A plurality of damping mechanisms may be positioned between the sensor assembly and the sensor assembly mount, wherein the plurality of damping mechanisms contact an upper surface of the sensor assembly and contact a lower surface of the sensor assembly mount.

The one or more damping mechanisms may comprise one or more of helical springs, leaf springs, isolation pads, and plungers.

The sensor assembly mount may further comprise one or more adjustment features to selectively position the sensor assembly relative to the sensor assembly mount.

Each adjustment feature may independently control the rotation of the sensor assembly about a principal axis comprising a pitch axis, a roll axis, and a yaw axis.

Each adjustment feature may comprise one or more adjustable screws or tabs positioned on the sensor assembly mount to rotate the sensor assembly about one or more principal axes.

The materials handling vehicle may further at least one removable sensor assembly cover mounted to the bumper mount housing, and a sensor assembly mount. The sensor assembly mount may comprise an angle bracket, a sensor assembly mounting plate mounted to the angle bracket, sensor assembly mounting hardware removable securing the sensor assembly to the angle bracket, and a sensor window aligned with a sensing portion of the sensor assembly defined by the at least one removable sensor assembly.

The sensor assembly may comprise a LiDAR sensor, and the sensor window may define a field of view that is greater than or equal to 170 degrees and less than or equal to 210 degrees in a horizontal plane, with the vehicle supported by the wheel assemblies on a horizontal operating surface.

The bumper mount housing may comprise a deflection cap that is sloped downwardly towards the horizontal operating plane of the vehicle, and side walls that extend outwardly from the vehicle body in a sloped manner to define an outwardly contracting housing volume. The bumper mount housing may be mounted to the vehicle body and the sensor assembly mount is mounted to the bumper mount housing. The angle bracket of the sensor assembly mount may be mounted to the bumper mount housing.

In accordance with another embodiment of the present disclosure, there is provided an industrial materials handling vehicle. The materials handling vehicle may comprise a vehicle body supported by a steer wheel assembly and at least one wheel assembly, and a sensor accommodating bumper mount mounted to a body panel of the vehicle body. The body panel of the vehicle body may define a steer wheel access opening. The sensor accommodating bumper mount further comprises a bumper mount housing coupled to the body panel of the vehicle body, and a sensor assembly mount removably coupled to the body panel of the vehicle body, the bumper mount housing, or both. The sensor accommodating bumper mount may further comprise a sensor assembly movably mounted to the sensor assembly mount, wherein the sensor assembly and the sensor assembly mount is positioned at a first distance above a horizontal operating plane defined by the materials handling vehicle, and wherein the steer wheel access opening is positioned at a second distance above the horizontal operating plane, the second distance being less than the first distance. Unobstructed access to the steer wheel assembly may be provided through the steer wheel access opening when the sensor assembly mount is mounted.

According to another embodiment of the present disclosure, an industrial materials handling vehicle is provided. The materials handling vehicle may comprise a vehicle body supported by a steer wheel assembly and at least one wheel assembly, and a sensor accommodating bumper mount mounted to a body panel of the vehicle body. The body panel of the vehicle body may define a steer wheel access opening. The sensor accommodating bumper mount may further comprise a bumper mount housing coupled to the body panel of the vehicle body that defines a complementary wheel access opening. The sensor accommodating bumper mount may also comprise a sensor assembly mount movably coupled to at least one of the body panel of the vehicle body or the bumper mount housing proximal to the steer wheel access opening. A sensor assembly may be movably mounted to the sensor assembly mount, wherein the sensor assembly mount is positioned adjacent to the steer wheel access opening and the complementary steer wheel access opening when the sensor assembly mount is mounted to the at least one of the body panel of the vehicle body or the bumper housing providing unobstructed access to the steer wheel assembly through the steer wheel access opening and the complementary steer wheel access opening.

In accordance with additional embodiments of the disclosure, an industrial materials handling vehicle is provided having a sensor accommodating bumper mount mounted to the vehicle body, the bumper, or both.

In accordance with alternative embodiments of the present disclosure, a movable sensor assembly and sensor accommodating bumper mount may be mounted to the vehicle body, the bumper, or both of a materials handling vehicle.

Various aspects of the present disclosure will enjoy applicability to any of the preceding and subsequently disclosed embodiments, aspects, features, and characteristics of the present disclosure. Specifically, according to a first aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a bumper mount housing that may comprise a complementary steer wheel access opening.

According to a second aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a sensor assembly mount removably mounted to the bumper, the bumper mount housing, or both.

According to a third aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a sensor assembly mounted to the sensor assembly mount.

According to a fourth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a sensor assembly mount removably mounted to the bumper, the bumper mount housing, or both.

According to a fifth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a sensor assembly and a sensor assembly mount at least partially obstruct the steer wheel access opening and the complementary steer wheel access opening when the sensor assembly mount is mounted to the bumper, the bumper mount housing, or both, and provide at least partial access to the steer wheel assembly through the steer wheel access opening and the complementary steer wheel access opening when the sensor assembly mount is unmounted.

According to a sixth aspect of the present disclosure, which may be combined selectively with preceding or subsequently disclosed embodiments, aspects, features, and characteristics of the present disclosure, the materials handling vehicle may comprise a vehicle body supported by a plurality of wheel assemblies, and a sensor accommodating bumper mount mounted to the vehicle body. The vehicle body defines a steer wheel access opening. The sensor accommodating bumper mount may comprise a sensor assembly and a sensor assembly mount at least partially obstruct the steer wheel access opening and the complementary steer wheel access opening when the sensor assembly mount is mounted to the vehicle body, and provide at least partial access to the steer wheel assembly through the steer wheel access opening and the complementary steer wheel access opening when the sensor assembly mount is unmounted.

According to a seventh aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a bumper mount housing that may comprise a complementary steer wheel access opening.

According to an eighth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise removably mounted to the body panel of the vehicle body, the bumper mount housing, or both.

According to a ninth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a sensor assembly movably mounted to the sensor assembly mount.

According to a tenth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, a bumper coupled to the vehicle body, and a sensor accommodating bumper mount mounted to the vehicle body, the bumper, or both. The vehicle body and the bumper may cooperate to define a steer wheel access opening. The sensor accommodating bumper mount may comprise a sensor assembly and a sensor assembly mount such that the sensor assembly and the sensor assembly mount are positioned above the steer wheel access opening and the complementary steer wheel access opening relative to a horizontal operating plane defined by the materials handling vehicle when the sensor assembly mount is mounted to the body panel of the vehicle body, the bumper mount housing, or both, to provide unobstructed access to the steer wheel assembly through the steer wheel access opening and the complementary steer wheel access opening.

According to an eleventh aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, and a sensor accommodating bumper mount mounted to a body panel of the vehicle body. The body panel of the vehicle body define a steer wheel access opening. The sensor accommodating bumper mount may comprise a bumper mount housing coupled to the body panel of the vehicle body.

According to a twelfth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, and a sensor accommodating bumper mount mounted to a body panel of the vehicle body. The body panel of the vehicle body define a steer wheel access opening. The sensor accommodating bumper mount may comprise a sensor assembly mount removably coupled to the body panel of the vehicle body, the bumper mount housing, or both.

According to a thirteenth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, and a sensor accommodating bumper mount mounted to a body panel of the vehicle body. The body panel of the vehicle body define a steer wheel access opening. The sensor accommodating bumper mount may comprise a sensor assembly movably mounted to the sensor assembly mount, wherein the sensor assembly and the sensor assembly mount is positioned at a first distance above a horizontal operating plane defined by the materials handling vehicle, and wherein the steer wheel access opening is positioned at a second distance above the horizontal operating plane, the second distance being less than the first distance, such that unobstructed access to the steer wheel assembly through the steer wheel access opening when the sensor assembly mount is mounted.

According to a fourteenth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, and a sensor accommodating bumper mount mounted to a body panel of the vehicle body. The body panel of the vehicle body define a steer wheel access opening. The sensor accommodating bumper mount may comprise a sensor assembly mount movably coupled to at least one of the body panel of the vehicle body or a bumper mount housing proximal to the steer wheel access opening.

According to a fifteenth aspect of the present disclosure, which may be combined selectively with preceding or subsequently disclosed embodiments, aspects, features, and characteristics of the present disclosure, the materials handling vehicle may comprise a vehicle body supported by a steer wheel assembly and a plurality of wheel assemblies, and a sensor accommodating bumper mount mounted to a body panel of the vehicle body. The body panel of the vehicle body define a steer wheel access opening. The sensor accommodating bumper mount may comprise a sensor assembly movably mounted to a sensor assembly mount, wherein the sensor assembly mount is positioned adjacent to the steer wheel access opening when the sensor assembly mount is mounted to the at least one of the body panel of the vehicle body or a bumper housing providing unobstructed access to the steer wheel assembly through the steer wheel access opening.

According to a first feature of the any of aforementioned aspects of the present disclosure, which may be combined selectively with preceding or subsequently disclosed embodiments, aspects, features, and characteristics of the present disclosure, removal of the sensor assembly mount defines an unobstructed path to a wheel face of the steer wheel assembly.

According to a second feature of any of the aforementioned aspects of the present disclosure, which may be combined selectively with preceding or subsequently disclosed embodiments, aspects, features, and characteristics of the present disclosure the sensor assembly and the sensor assembly mount form an integrated sensor assembly unit.

According to a first characteristic of the second feature of any of the aforementioned aspects of the present disclosure, the integrated sensor assembly unit is removable from the materials handling vehicle.

According to a second characteristic of the second feature of any of the aforementioned aspects of the present disclosure, removing the sensor assembly mount removes the integrated sensor assembly unit.

According to a third feature of any of the aforementioned aspects of the present disclosure, which may be combined selectively with preceding or subsequently disclosed embodiments, aspects, features, and characteristics of the present disclosure the sensor assembly mount comprises a sensor assembly mounting base.

According to a fourth feature of any of the aforementioned aspects of the present disclosure, which may be combined selectively with preceding or subsequently disclosed embodiments, aspects, features, and characteristics of the present disclosure the sensor assembly mount comprises a sensor assembly mounting plate mounted to the sensor assembly mounting base.

According to a fifth feature of any of the aforementioned aspects of the present disclosure, which may be combined selectively with preceding or subsequently disclosed embodiments, aspects, features, and characteristics of the present disclosure the sensor assembly mount comprises sensor assembly mounting hardware removably securing the sensor assembly to the sensor assembly mounting plate.

According to a sixth feature of any of the aforementioned aspects of the present disclosure, which may be combined selectively with preceding or subsequently disclosed embodiments, aspects, features, and characteristics of the present disclosure the sensor assembly mount further comprises a supplemental bumper plate.

According to a first characteristic of the sixth feature of any of the aforementioned aspects of the present disclosure, which may be combined selectively with preceding or subsequently disclosed embodiments, aspects, features, and characteristics of the present disclosure the supplemental bumper plate is mounted to the sensor assembly base.

According to a second characteristic of the sixth feature of any of the aforementioned aspects of the present disclosure, which may be combined selectively with preceding or subsequently disclosed embodiments, aspects, features, and characteristics of the present disclosure the supplemental bumper plate extends outwardly from the sensor assembly mounting plate.

According to a third characteristic of the sixth feature of any of the aforementioned aspects of the present disclosure, which may be combined selectively with preceding or subsequently disclosed embodiments, aspects, features, and characteristics of the present disclosure the supplemental bumper plate is sloped to follow the contour of the bumper mount housing.

According to a seventh feature of any of the aforementioned aspects of the present disclosure, which may be combined selectively with preceding or subsequently disclosed embodiments, aspects, features, and characteristics of the present disclosure the materials handling vehicle further comprises a sensor assembly cover.

According to a first characteristic of the seventh feature of any of the aforementioned aspects of the present disclosure, which may be combined selectively with preceding or subsequently disclosed embodiments, aspects, features, and characteristics of the present disclosure the sensor assembly cover is mounted to the bumper housing.

According to an eighth feature of any of the aforementioned aspects of the present disclosure, which may be combined selectively with preceding or subsequently disclosed embodiments, aspects, features, and characteristics of the present disclosure the materials handling vehicle further comprises a removable sensor assembly cover.

According to a first characteristic of the eighth feature of any of the aforementioned aspects of the present disclosure, which may be combined selectively with preceding or subsequently disclosed embodiments, aspects, features, and characteristics of the present disclosure, the removable sensor assembly cover is mounted to the bumper mount housing.

According to a ninth feature of any of the aforementioned aspects of the present disclosure, which may be combined selectively with preceding or subsequently disclosed embodiments, aspects, features, and characteristics of the present disclosure the sensor assembly mount comprises a supplemental bumper plate.

According to a first characteristic of the ninth feature of any of the aforementioned aspects of the present disclosure, which may be combined selectively with preceding or subsequently disclosed embodiments, aspects, features, and characteristics of the present disclosure, the sensor assembly cover and the supplemental bumper plate cooperate to define a sensor window aligned with a sensing portion of the sensor assembly.

According to a second characteristic of the ninth feature of any of the aforementioned aspects of the present disclosure, which may be combined selectively with preceding or subsequently disclosed embodiments, aspects, features, and characteristics of the present disclosure the sensor window defines a field of view that is greater than or equal to 170 degrees and less than or equal to 210 degrees in a horizontal plane, with the vehicle supported by the wheel assemblies on a horizontal operating surface.

According to an third characteristic of the ninth feature of any of the aforementioned aspects of the present disclosure, which may be combined selectively with preceding or subsequently disclosed embodiments, aspects, features, and characteristics of the present disclosure the bumper mount housing comprises a deflection cap.

According to a tenth feature of any of the aforementioned aspects of the present disclosure, which may be combined selectively with preceding or subsequently disclosed embodiments, aspects, features, and characteristics of the present disclosure the bumper mount housing comprises a deflection cap.

According to a first characteristic of the tenth feature of any of the aforementioned aspects of the present disclosure, which may be combined selectively with preceding or subsequently disclosed embodiments, aspects, features, and characteristics of the present disclosure the deflection cap that is sloped downwardly.

According to an eleventh feature of any of the aforementioned aspects of the present disclosure, which may be combined selectively with preceding or subsequently disclosed embodiments, aspects, features, and characteristics of the present disclosure the bumper mount housing comprises side walls.

According to a first characteristic of the eleventh feature of any of the aforementioned aspects of the present disclosure, which may be combined selectively with preceding or subsequently disclosed embodiments, aspects, features, and characteristics of the present disclosure the side walls are sloped to define an outwardly contracting housing volume.

According to a second characteristic of the eleventh feature of any of the aforementioned aspects of the present disclosure, which may be combined selectively with preceding or subsequently disclosed embodiments, aspects, features, and characteristics of the present disclosure the sensor assembly mount comprises a supplemental bumper plate that extends outwardly relative to the vehicle body in alignment with the bumper mount housing side walls.

According to a twelfth feature of any of the aforementioned aspects of the present disclosure, which may be combined selectively with preceding or subsequently disclosed embodiments, aspects, features, and characteristics of the present disclosure the sensor assembly mount includes mounting hardware passages that are aligned with complementary mounting hardware passages in the bumper mount housing; and mounting hardware that extends through mounting hardware passages of the sensor assembly mount and extends through or engages complementary mounting hardware passages of the bumper mount housing to removably secure the sensor assembly mount to the bumper mount housing.

According to a thirteenth feature of any of the aforementioned aspects of the present disclosure, which may be combined selectively with preceding or subsequently disclosed embodiments, aspects, features, and characteristics of the present disclosure the materials handling vehicle further comprises a removable sensor assembly cover mounted to the bumper mount housing.

According to a first characteristic of the eleventh feature of any of the aforementioned aspects of the present disclosure, which may be combined selectively with preceding or subsequently disclosed embodiments, aspects, features, and characteristics of the present disclosure, the materials handling vehicle further comprises a sensor assembly mount.

According to a first variation of the aforementioned characteristic, which variation may be combined selectively with preceding or subsequently disclosed embodiments, aspects, features, and characteristics of the present disclosure, the sensor assembly mount comprises a sensor assembly mounting base, a sensor assembly mounting plate mounted to the sensor assembly mounting base, sensor assembly mounting hardware removably securing the sensor assembly to the sensor assembly mounting plate, and a supplemental bumper plate mounted to the sensor assembly mounting base.

According to a fourteenth feature of any of the aforementioned aspects of the present disclosure, which may be combined selectively with preceding or subsequently disclosed embodiments, aspects, features, and characteristics of the present disclosure, the sensor assembly mount further comprises one or more adjustment features to selectively position the sensor assembly relative to the sensor assembly mount.

According to a first characteristic of the fourteenth feature of any of the aforementioned aspects of the present disclosure, which may be combined selectively with preceding or subsequently disclosed embodiments, aspects, features, and characteristics of the present disclosure, each adjustment feature independently controls the rotation of the sensor assembly about a principal axis comprising a pitch axis, a roll axis, and a yaw axis.

According to a second characteristic of the fourteenth feature of any of the aforementioned aspects of the present disclosure, which may be combined selectively with preceding or subsequently disclosed embodiments, aspects, features, and characteristics of the present disclosure, each adjustment feature comprises one or more adjustable screws or tabs positioned on the sensor assembly mount to rotate the sensor assembly about one or more principal axes materials handling vehicle further comprises a sensor assembly mount.

According to a fifteenth feature of any of the aforementioned aspects of the present disclosure, which may be combined selectively with preceding or subsequently disclosed embodiments, aspects, features, and characteristics of the present disclosure, the sensor assembly mount comprises one more damping mechanisms positioned between the sensor and the sensor assembly mount.

According to a first characteristic of the fifteenth feature of any of the aforementioned aspects of the present disclosure, which may be combined selectively with preceding or subsequently disclosed embodiments, aspects, features, and characteristics of the present disclosure, a plurality of damping mechanisms are positioned between the sensor assembly and the sensor assembly mount.

According to a second characteristic of the fifteenth feature of any of the aforementioned aspects of the present disclosure, which may be combined selectively with preceding or subsequently disclosed embodiments, aspects, features, and characteristics of the present disclosure, the plurality of damping mechanisms contact an upper surface of the sensor assembly and contact a lower surface of the sensor assembly mount.

According to a third characteristic of the fifteenth feature of any of the aforementioned aspects of the present disclosure, which may be combined selectively with preceding or subsequently disclosed embodiments, aspects, features, and characteristics of the present disclosure, the damping mechanisms comprises one or more of helical springs, leaf springs, isolation pads, and plungers.

According to a sixteenth feature of any of the aforementioned aspects of the present disclosure, which may be combined selectively with preceding or subsequently disclosed embodiments, aspects, features, and characteristics of the present disclosure, the sensor assembly mount comprises an angle bracket coupling the sensor assembly mount to the bumper mount housing.

According to a first characteristic of the sixteenth feature of any of the aforementioned aspects of the present disclosure, which may be combined selectively with preceding or subsequently disclosed embodiments, aspects, features, and characteristics of the present disclosure, the angle bracket is configured to enable the sensor assembly mount to swing out horizontally about an attachment point.

According to a second characteristic of the sixteenth feature of any of the aforementioned aspects of the present disclosure, which may be combined selectively with preceding or subsequently disclosed embodiments, aspects, features, and characteristics of the present disclosure, the angle bracket includes one or more movement channels.

According to a variation of the second characteristic of the sixteenth feature of any of the aforementioned aspects of the present disclosure, which may be combined selectively with preceding or subsequently disclosed embodiments, aspects, features, and characteristics of the present disclosure, the angle bracket is fixed to the sensor assembly mount at a first side and the angle bracket is selectively coupled to the bumper mount housing within the at least one movement channel at a second side via at least one attachment screw positioned within the at least one movement channel, and wherein loosening the at least one attachment screw enables the angle bracket to move according to dimensions of the at least one movement channel.

According to a seventeenth feature of any of the aforementioned aspects of the present disclosure, which may be combined selectively with preceding or subsequently disclosed embodiments, aspects, features, and characteristics of the present disclosure, the sensor assembly mount comprises an angle bracket, a sensor assembly mounting plate mounted to the angle bracket, and sensor assembly mounting hardware removably securing the sensor assembly to the angle bracket.

According to a first characteristic of the seventeenth feature of any of the aforementioned aspects of the present disclosure, which may be combined selectively with preceding or subsequently disclosed embodiments, aspects, features, and characteristics of the present disclosure, the angle bracket is configured to enable the sensor assembly mount to swing out horizontally about an attachment point.

According to a second characteristic of the seventeenth feature of any of the aforementioned aspects of the present disclosure, which may be combined selectively with preceding or subsequently disclosed embodiments, aspects, features, and characteristics of the present disclosure, the angle bracket comprises at least one movement channel, is fixed to the sensor assembly mount at a first side, and is selectively coupled to the bumper mount housing within the at least one movement channel at a second side via at least one attachment screw positioned within the at least one movement channel.

According to a eighteenth feature of any of the aforementioned aspects of the present disclosure, which may be combined selectively with preceding or subsequently disclosed embodiments, aspects, features, and characteristics of the present disclosure, the materials handling vehicle further comprises at least one removable sensor assembly cover mounted to the bumper mount housing, and a sensor window aligned with a sensing portion of the sensor assembly defined by the at least one removable sensor assembly cover.

According to a first characteristic of the eighteenth feature of any of the aforementioned aspects of the present disclosure, which may be combined selectively with preceding or subsequently disclosed embodiments, aspects, features, and characteristics of the present disclosure, the sensor assembly comprises a LiDAR sensor.

According to a second characteristic of the eighteenth feature of any of the aforementioned aspects of the present disclosure, which may be combined selectively with preceding or subsequently disclosed embodiments, aspects, features, and characteristics of the present disclosure, the sensor window defines a field of view that is greater than or equal to 170 degrees and less than or equal to 210 degrees in a horizontal plane, with the vehicle support by the wheel assemblies on a horizontal operating surface.

For the purposes of defining and describing the concepts and scope of the present disclosure, it is noted that (i) an "industrial materials handling vehicle" comprises any conventional or yet-to-be developed vehicle for transporting goods in a warehouse environment and (ii) a "warehouse" encompasses any indoor or outdoor industrial facility in which industrial materials handling vehicles transport goods including, but not limited to, indoor or outdoor industrial facilities that are intended primarily for the storage of goods, such as those where multi-level racks are arranged in aisles, and manufacturing facilities where goods are transported about the facility by industrial materials handling vehicles for use in one or more manufacturing processes.

In the illustrated embodiments, the industrial materials handling vehicle comprises a stand-up rider lift truck such as, for example, a Crown RC 5700 Series lift truck, but may alternatively comprise any of a variety of conventional or yet-to-be developed industrial materials handling vehicles where there is a need for the provision of a sensor accommodating bumper mount. Accordingly, although the concepts of the present disclosure are described herein with primary reference to a stand-up rider lift truck, it is contemplated that the concepts will enjoy applicability to any industrial materials handling vehicle where the provision of a sensor accommodating bumper mount would be beneficial.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
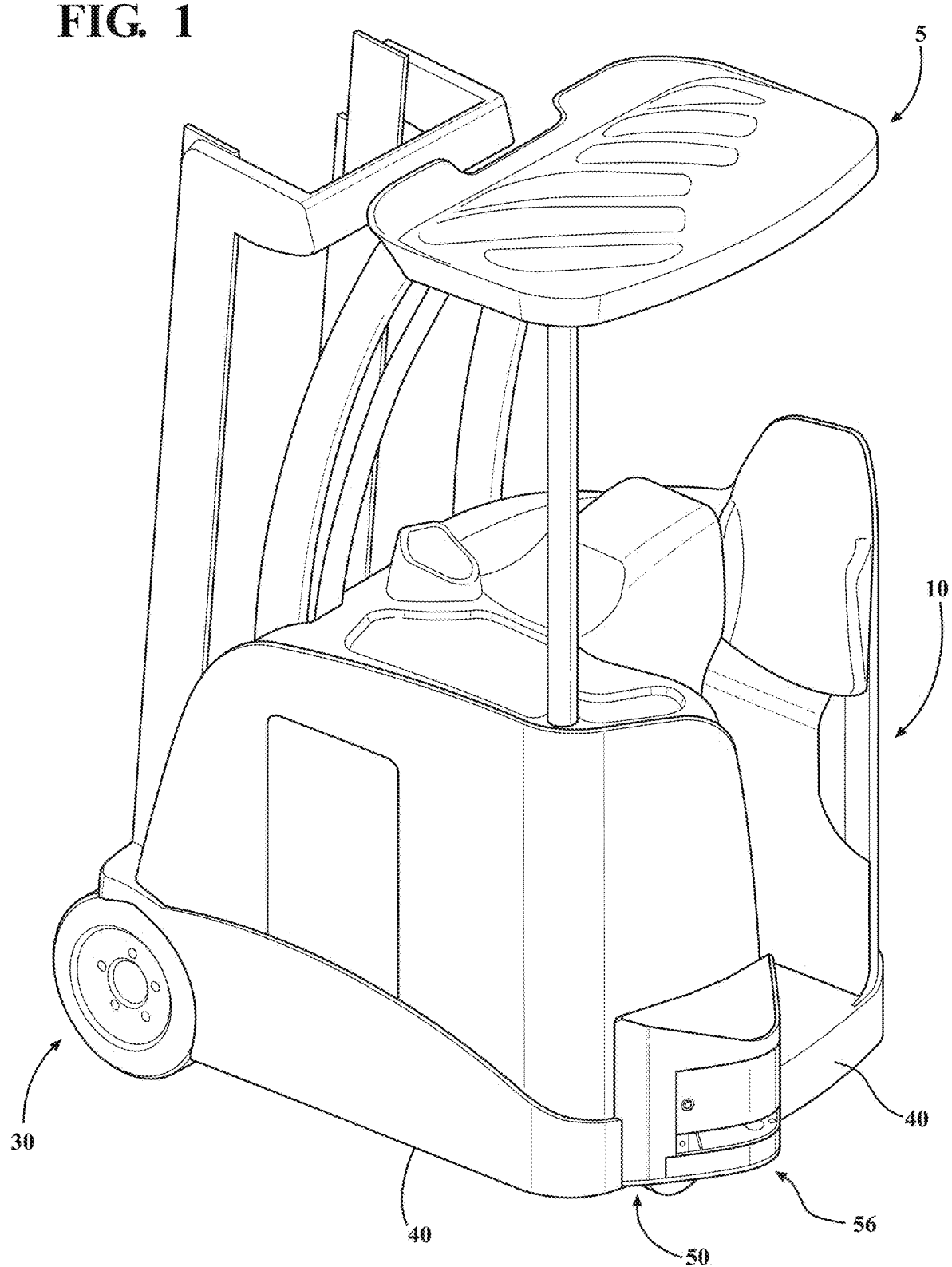
FIG. 1 illustrates a materials handling vehicle comprising a low-mount sensor accommodating bumper mount, according to one embodiment of the present disclosure.
Figure 2:
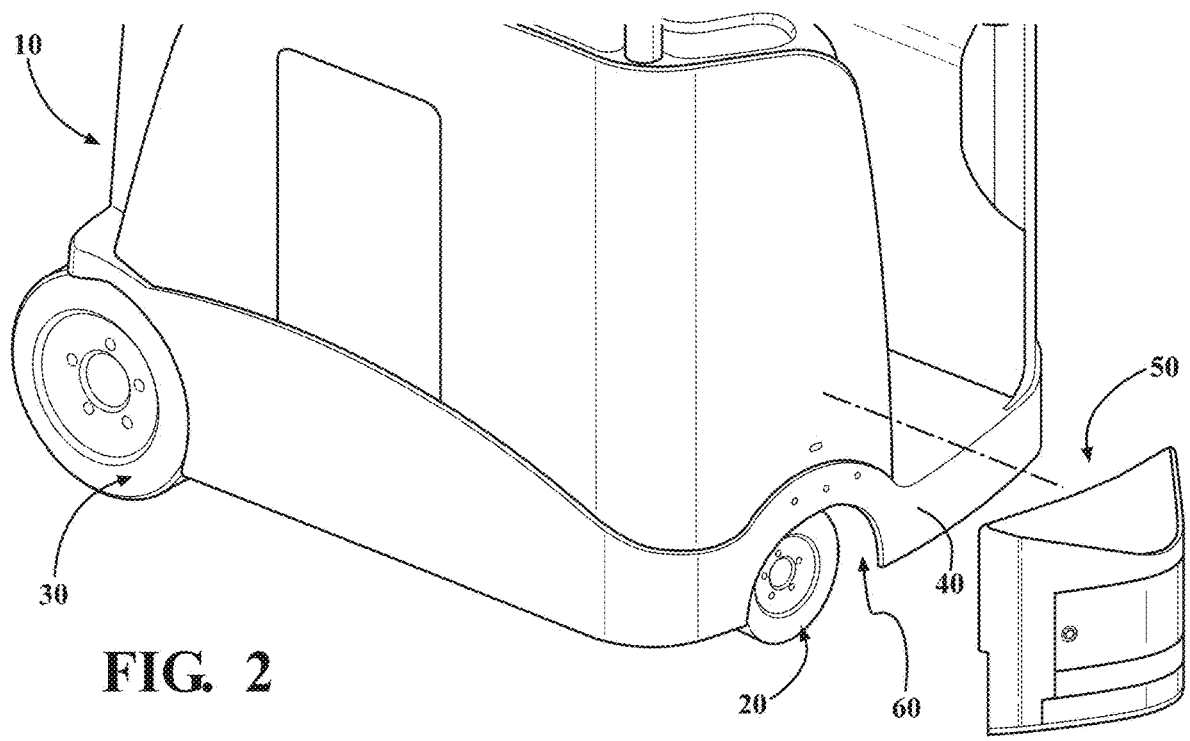
FIG. 2 illustrates the materials handling vehicle of FIG. 1 with the sensor accommodating bumper mount removed.
Figure 3:
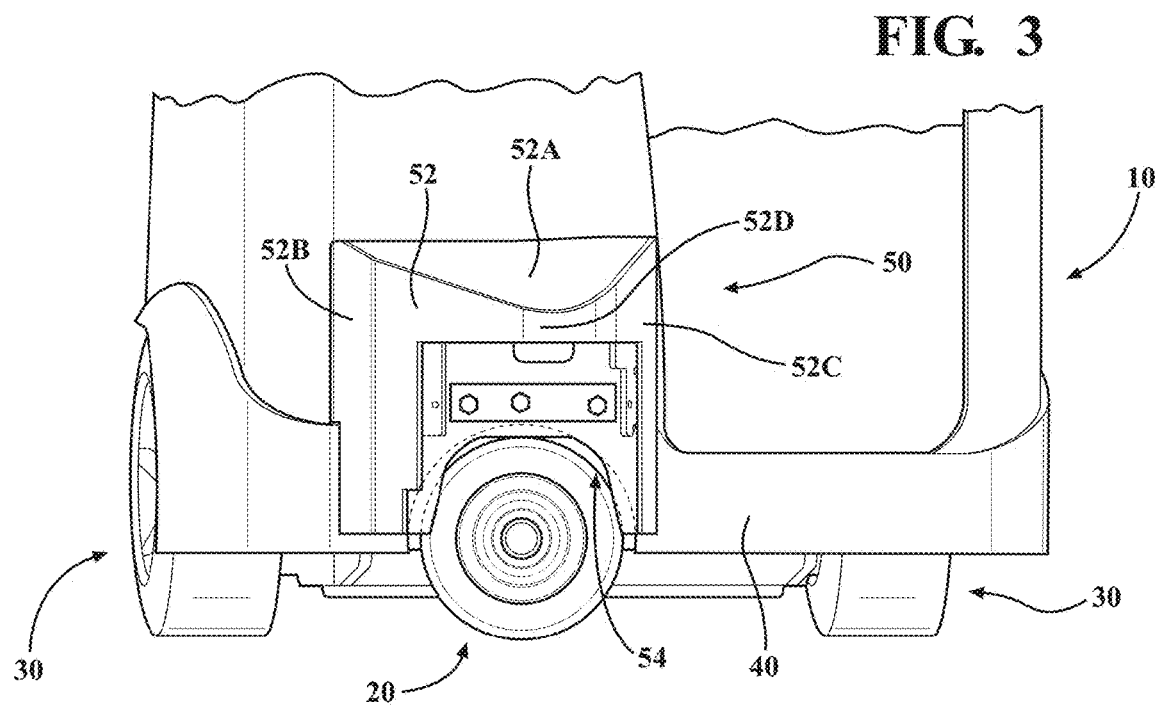
FIG. 3 illustrates the materials handling vehicle of FIG. 1 with portions of the attached sensor accommodating bumper mount removed.

Referring initially to FIGS. 1-3, the figures depict an illustrative embodiment of an industrial materials handling vehicle 5 comprising a vehicle body 10 supported by a steer wheel assembly 20 and a plurality of additional wheel assemblies 30. The materials handling vehicle 5 comprises a bumper 40 coupled to the vehicle body 10, and a sensor accommodating bumper mount 50 mounted to the vehicle body 10, the bumper 40, or both. The vehicle body 10 and the bumper 40 cooperate to define a steer wheel access opening 60. The sensor accommodating bumper mount 50 comprises a bumper mount housing 52, which further comprises a complementary steer wheel access opening 54. In some embodiments, the materials handling vehicle 5 comprises a separate, distinct bumper 40 mounted or otherwise attached to the vehicle body 10. In some embodiments, the materials handling vehicle 5 comprises a bumper 40 that is integrally formed with the vehicle body 10 or the bumper 40 is defied by a bottom portion of the vehicle body 10, proximate the steer wheel assembly 20 and the plurality of additional wheel assemblies 30. It should be understood, that the materials handling vehicle 5 and vehicle body 10 do not require a distinct, separate bumper 40 and calling the mount 50 a "bumper" mount 50 does not imply the presence of a separate bumper. In embodiments, the bumper mount 50 may be directly mounted to the vehicle body 10.

Figure 4:
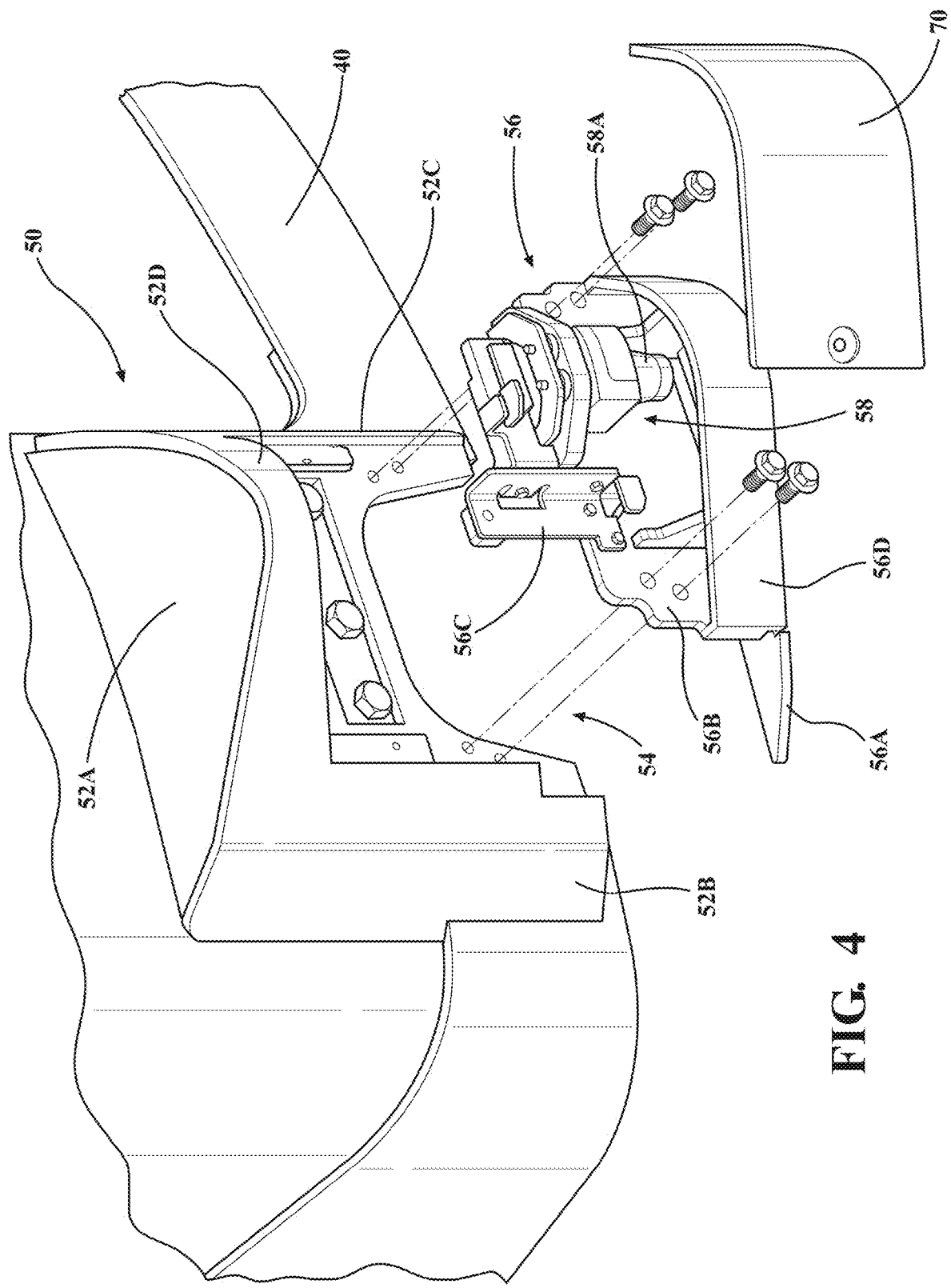
FIG. 4 is a partially exploded view of a sensor accommodating bumper mount for a materials handling vehicle, according to one embodiment of the present disclosure.

Referring to FIG. 4, the sensor accommodating bumper mount 50 also comprises a sensor assembly mount 56 that can be removably mounted to the bumper 40, the bumper mount housing 52, or both. Furthermore, the sensor accommodating bumper mount 50 comprises a sensor assembly 58 mounted to the sensor assembly mount 56. The sensor assembly 58 and the sensor assembly mount 56 at least partially obstruct the steer wheel access opening 60 and the complementary steer wheel access opening 54 when the sensor assembly mount 56 is mounted to the bumper 40, the bumper mount housing 52, or both. Additionally, the sensor accommodating bumper mount 50 provides at least partial access to the steer wheel assembly 20 through the steer wheel access opening 60 and the complementary steer wheel access opening 54 when the sensor assembly mount 56 is unmounted. The removably mounted sensor assembly mount 56 provides the added benefit of enabling selective access to the steer wheel assembly 20 and the steer wheel access opening 60. If maintenance to the steer wheel assembly 20 is required, the sensor assembly mount 56 can be efficiently removed from the accommodating bumper mount 50 to provide at least partial access to the steer wheel assembly 20 for wheel maintenance or the steer wheel access opening 60 for additional maintenance procedures. When maintenance is completed, the sensor assembly mount 56 can be mounted to the bumper 40 or the bumper mount housing 50 to partially obstruct the steer wheel access opening 60 and the complementary steer wheel access opening 54.

FIGS. 1-3 show that the vehicle body 10 is supported by the steer wheel assembly 20 and the plurality of additional wheel assemblies 30. In embodiments, the steer wheel assembly 20 may comprise a single wheel or multiple wheels coupled to a common axle. The steer wheel assembly 20 articulates about a fixed point to enable the materials handling vehicle 5 to turn. In some embodiments, the steer wheel assembly may be powered to impart motion to the materials handling vehicle 5. In embodiments, the plurality of additional wheel assemblies 30 comprises two wheel assemblies 30 arranged along a common drive axis. The two wheel assemblies 30 may be positioned along a common drive axis on opposite sides of the body 10 of the materials handling vehicle 5. In some embodiments, one or more of the wheel assemblies 30 may be powered to impart motion to the materials handling vehicle 5.

According to one or more embodiments, the industrial materials handling vehicle 5 may include one or more motors (not shown) operatively coupled to the steer wheel assembly 20. In such embodiments, the one or more motors may comprise, for example and without limitation, electric motors, internal combustion motors, hybrid motors, or any suitable combination thereof. In further embodiments, a transmission component (not shown) may interface between the one or more motors and the steer wheel assembly 20, configured to transfer power from the one or more motors to the steer wheel assembly 20, enabling activation and movement, e.g., rotation, drive, etc., of the steer wheel assembly 20 of the materials handling vehicle 5. Power for the one or more motors may be supplied, for example and without limitation, by battery, fuel-cell, fuel tank, or any suitable combination thereof. In accordance with some embodiments, one or more of the wheel assemblies 30 may be operatively coupled to the one or more motors, transmission, hydraulic or electric controls, etc.

According to further embodiments, the materials handling vehicle 5 may include one or more controllers communicatively coupled to the one or more motors, the at least one wheel assembly 30, the steer wheel assembly 20, and various other components. In such embodiments, the one or more controllers may receive input from a user/operator via manual controls, remote controls, or a combination thereof to control operations of the materials handling vehicle 5. In other embodiments, the one or more controllers may operate autonomously, receiving input from a variety of sensors, to control operations of the materials handling vehicle 5. In such embodiments, output from such sensors, e.g., the sensor assembly 58, may be used by the one or more controllers to present audible, visual, or other alerts, avoid objects, direct movement of the materials handling vehicle 5, and the like.

Referring collectively to FIG. 2 and FIG. 3, depicted is a materials handling vehicle 5 comprising a vehicle body 10 supported by a plurality of wheel assemblies 30, a bumper 40 coupled to the vehicle body 10, and a sensor accommodating bumper mount 50 that may be mounted to the vehicle body 10, the bumper 40, or both. In accordance with some embodiments, the bumper 40 may extend around a least a portion of the vehicle body 10 to create a section of the materials handling vehicle 5 surrounding one or more of the plurality of wheel assemblies 30 or the steer wheel assembly 20 with an increased mechanical strength to resist damage in the event of a collision. The vehicle body 10 and the bumper 40 may cooperate to define a steer wheel access opening 60. As shown in FIGS. 2 and 3, the steer wheel access opening 60 defines an opening within the vehicle body 10, the bumper 40, or both that is sized to accommodate the steer wheel assembly 20 and allow a user access to the entirety or a portion of the steer wheel assembly 20 through the body 10 and/or the bumper 40. In embodiments where the sensor accommodating bumper mount 50 is mounted to the vehicle body 10, the bumper 40 or both, the bumper mount housing 52 of the sensor accommodating bumper mount 50 comprises a complementary steer wheel access opening 54, wherein the steer wheel access opening 60 and the complementary steer wheel access opening 54 define an unobstructed path to a majority of a wheel face of the steer wheel assembly 20 upon removal of the sensor assembly mount 56 to enable selective access to the steer wheel assembly 20 for maintenance procedures.

In some embodiments, the sensor accommodating bumper mount 50 at least partially obstructs the steer wheel access opening 60 and the complementary steer wheel access opening 54 when the sensor assembly mount 56 is mounted to the bumper 40, the bumper mount housing 52, or both. However, the sensor assembly 56 and/or the bumper mount housing 52 can be selectively removed to provide at least partial access to the steer wheel assembly 20 through the steer wheel access opening 60 and/or the complementary steer wheel access opening 54. In embodiments, the sensor assembly 58 and the sensor assembly mount 56 form an integrated sensor assembly unit that are removable together from the materials handling vehicle 5 by removing the sensor assembly mount 56 to provide at least partial access to the steer wheel assembly 20 through the steer wheel access opening 60 and/or the complementary steer wheel access opening 54.

Referring to FIG. 3 in isolation, the sensor accommodating bumper mount 50 comprises the bumper mount housing 52 mounted to the vehicle body 10, the bumper 40, or both. The bumper mount housing 52 comprises a deflection cap 52A that is sloped downwardly with the materials handling vehicle 5 supported by the wheel assemblies 30 on a horizontal operating plane defined by the materials handling vehicle 5, e.g., the surface on which the materials handling vehicle 5 moves, rests, works, etc. In this manner, objects that might strike the bumper mount housing 52 from above will impact the bumper mount housing 52 with an indirect force and will be deflected away from the materials handling vehicle 5 so as to not damage the sensor assembly 58. Furthermore, the bumper mount housing 52 comprises housing side walls 52B, 52C that extend outwardly from the vehicle body 10 in a sloped manner to define an outwardly contracting housing volume, wherein the housing sidewalls 52B, 52C slope toward one another to terminate at a rounded nose 52D. In this manner, objects that forcibly engage the bumper mount housing 52 from a lateral direction will impact the bumper mount housing 52 with indirect force and will be deflected away from the vehicle 5 and sensor assembly 58. In embodiments, the bumper mount housing comprises two sidewalls 52B, 52C that may be positioned opposite one another about the steer wheel access opening 60 so that a portion of the outwardly contracting housing volume is positioned over the steer wheel access opening 60.

In embodiments, the bumper mount housing 52 comprises mounting hardware passages that are aligned with complementary mounting hardware passages in the vehicle body 10 and the bumper mount housing 52 comprises mounting hardware that extends through the mounting hardware passages of the bumper mount housing 52 and extends through or engages the complementary mounting hardware passages of the vehicle body 10 to secure or mount the bumper mount housing 52 to the vehicle body 10. It is noted that the term "removably" is used herein to describe vehicle components that may be removed and reinstalled repeatedly with, for example, mounting hardware such as bolts, nuts, machine screws, and other known or yet to be developed mounting hardware.

Referring now to FIG. 4, the sensor accommodating bumper mount 50 further comprises the sensor assembly mount 56. In embodiments, the bumper mount housing 52 is mounted to the vehicle body 10 and the sensor assembly mount 56 is mounted to the bumper mount housing 52. The sensor assembly mount 56 comprises a sensor assembly mounting base 56A; a sensor assembly mounting plate 56B mounted to the sensor assembly mounting base 56A; and a sensor assembly mounting hardware 56C removably securing the sensor assembly 58 to the sensor assembly mounting plate 56B.

The sensor assembly mounting plate 56B of the sensor assembly mount 56 is mounted to the bumper mount housing 52. The sensor assembly mount 56 comprises mounting hardware passages that are aligned with complementary mounting hardware passages in the bumper mount housing 52; and the sensor assembly mount 56 comprises mounting hardware that extends through mounting hardware passages of the sensor assembly mount 56 and extends through or engages the complementary mounting hardware passages of the bumper mount housing 52 to removably secure the sensor assembly mount 56 to the bumper mount housing 52 to enable convenient mounting or dismounting of the sensor assembly mount 56 to access the steer wheel 20 for maintenance procedures. It is noted that the term "removably" is used herein to describe vehicle components that may be removed and reinstalled repeatedly with, for example, mounting hardware such as bolts, nuts, machine screws, and other known or yet to be developed mounting hardware.

In embodiments, the sensor assembly mount 56 further comprises a supplemental bumper plate 56D that extends outwardly relative to the vehicle body 10 in alignment with the bumper mount housing side walls 52B, 52C. The supplemental bumper plate 56D may be mounted to the sensor assembly mounting base 56B to form an outer portion of the sensor assembly mount 56. The supplemental bumper plate 56D may extend between the bumper mount housing side walls 52B, 52C to further define the outwardly contracting housing volume created by the bumper mount housing side walls 52B, 52C. In this manner, objects that forcibly engage the bumper mount housing 52 or the sensor mount assembly 56 from a lateral direction will impact the housing with indirect force and will be deflected away from the vehicle. In embodiments, the supplemental bumper plate 56D extends outwardly from the sensor assembly mounting plate 56B in a corresponding sloped manner to follow the contour of the bumper mount housing 52. Furthermore, the sensor assembly mounting plate 56B and the supplemental bumper plate 56D may extend perpendicularly from the sensor assembly mounting base 56A to form a semi-enclosed region above a first surface of the sensor assembly mounting base 56A. In embodiments, the semi-enclosed region defined by the sensor assembly mounting base 56A, the sensor assembly mounting plate 56B, and the supplemental bumper plate 56D may be positioned below the sensor assembly 58.

Still referring to FIG. 4, the sensor accommodating bumper mount 50 further comprises the sensor assembly 58. The sensor assembly 58 is removably mounted to the sensor assembly mounting plate 56B via sensor assembly mounting hardware 56C. The sensor assembly mounting plate 56B comprises mounting hardware passages that are aligned with complementary mounting hardware passages in the sensor assembly mounting hardware 56C; and the sensor assembly mounting hardware 56C extends through mounting hardware passages of the sensor assembly mounting plate 56B to removably secure the sensor assembly 58 to the sensor assembly mounting plate 56B. It is noted that the term "removably" is used herein to describe vehicle components that may be removed and reinstalled repeatedly with, for example, mounting hardware such as bolts, nuts, machine screws, and other known or yet to be developed mounting hardware.

In embodiments, the sensor assembly 58 comprises a LiDAR sensor. However, although the concepts of the present disclosure are discussed with primary reference to a LiDAR sensor, it is contemplated that the sensor accommodating bumper mount may comprise any of a variety of conventional or yet-to-be developed sensors including, for example, non-LiDAR laser scanners, vision systems, UWB transceivers, ultrasonic sensors, or the like.

Figure 5:
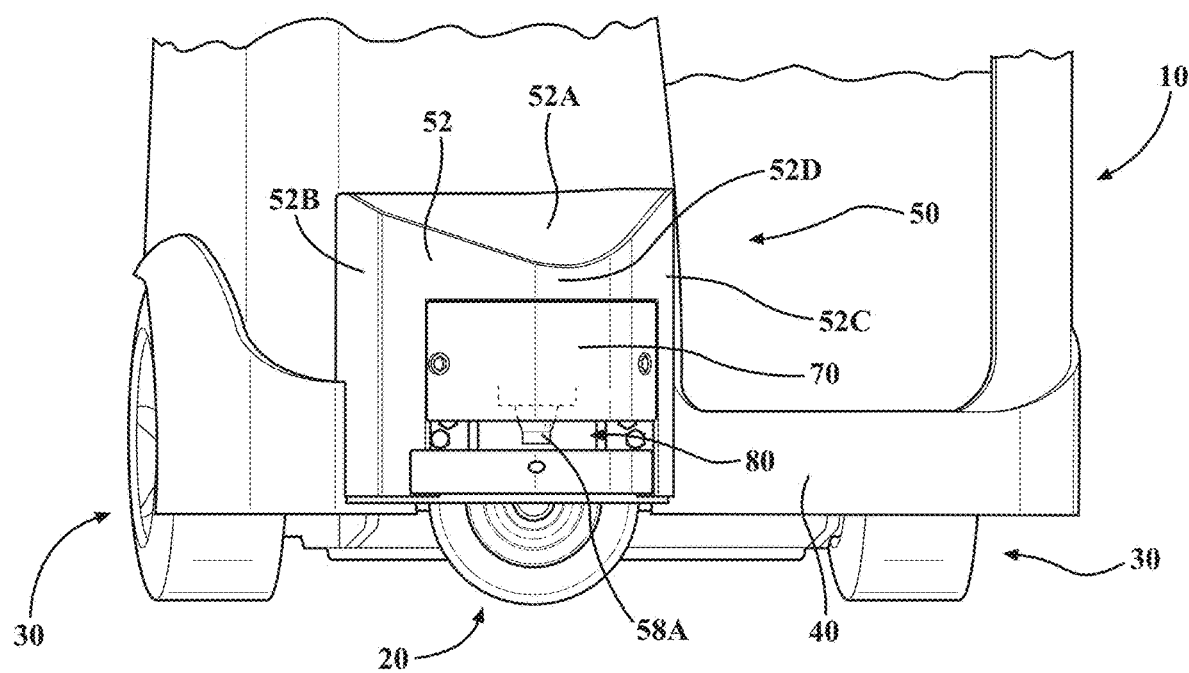
FIG. 5 is an isometric view of a materials handling vehicle with an attached sensor accommodating bumper mount, according to one embodiment of the present disclosure.

Referring to FIG. 4 and FIG. 5, the sensor assembly cover wherein the sensor accommodating bumper mount further comprises a sensor assembly cover 70 mounted to the bumper mount housing 52. In embodiments, the sensor assembly cover 70 may be removably mounted to the bumper mount housing 52 to enable a user to selectively access the sensor assembly. The sensor assembly cover may extend outwardly from the bumper mount housing 52 in a corresponding sloped manner to follow the contour of the bumper mount housing 52. Additionally, the sensor assembly mount 56 comprises a supplemental bumper plate 56D. The sensor assembly cover 70 and the supplemental bumper plate 56D are positioned relative to one another such that the sensor assembly cover 70 and the supplemental bumper plate 56 cooperate to define a sensor window 80 that is aligned with a sensing portion 58A of the sensor assembly 58. In embodiments, the sensor assembly 58 comprises a LiDAR sensor. The sensor window may define a field of view that is maximzed for optimal object detection. For example, given the hardware limitations presented by particular materials handling vehicles, in some embodiments the field of view may be greater than or equal to 170 degrees and less than or equal to 210 degrees in a horizontal plane, with the materials handling vehicle 5 supported by the wheel assemblies 30 on a horizontal operating surface. According to other embodiments, the field of view may be implemented in ranges greater than 210 degrees. In embodiments, the bumper mount housing 52 may couple with the sensor assembly mount 56, so that the deflection cap 52A, the housing side walls 52B, 52C, the supplemental bumper plate 56D, and the sensor assembly cover 70 collectively define an interior region to at least partially enclose the sensor assembly 58.

Figure 6:
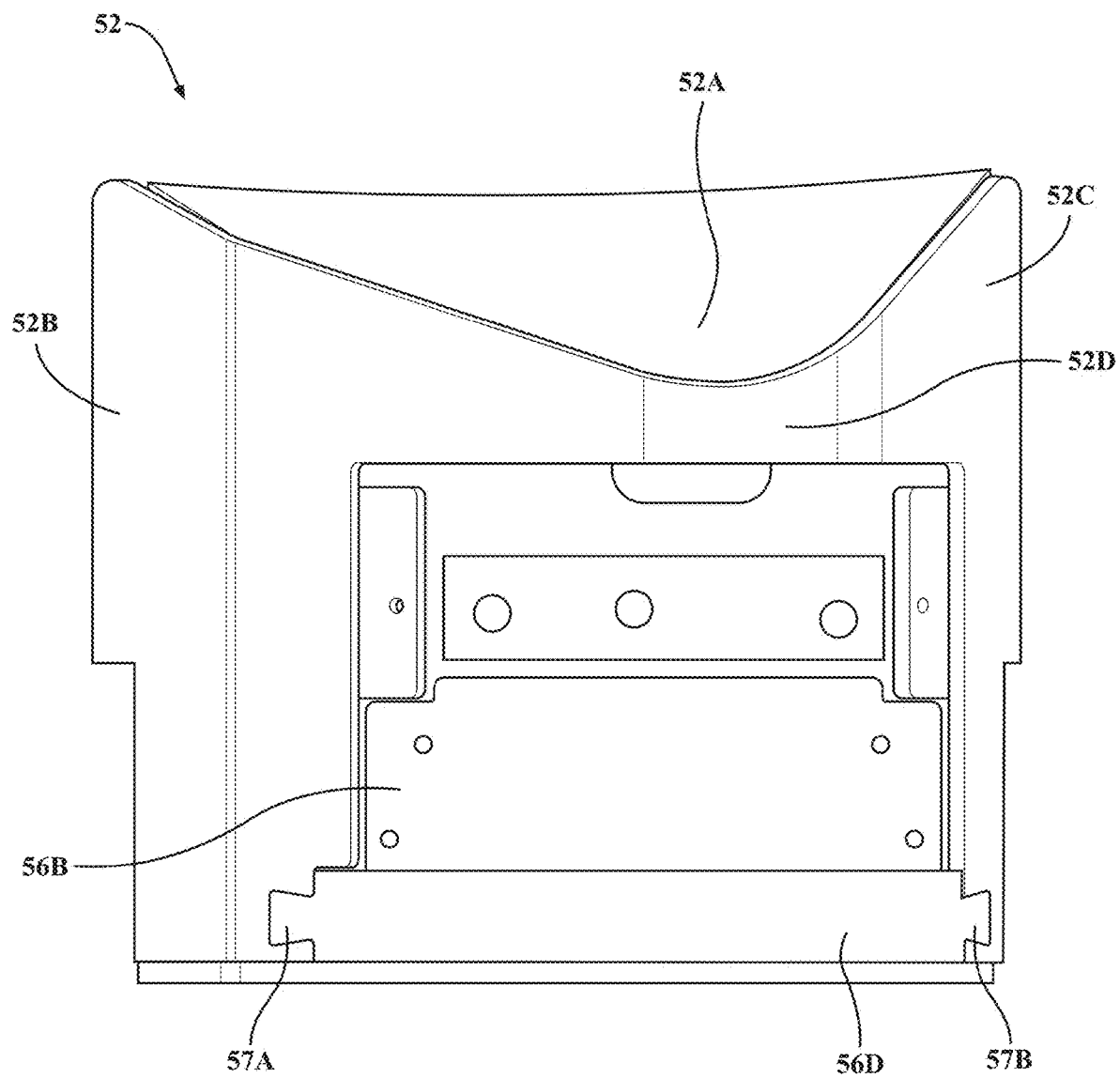
FIG. 6 illustrates a view of a sensor accommodating bumper mount for a materials handling vehicle, according to one embodiment of the present disclosure.

Referring to FIG. 6, depicted is an isolated view of the bumper mount housing 52 in accordance with some embodiments contemplated and disclosed herein. As shown in FIG. 6, the supplemental bumper plate 56D includes dovetails 57A, 57B positioned at distal ends thereof. The dovetails 57A, 57B are configured to frictionally engage corresponding passageways of the housing side walls 52B, 52C. In accordance with such an embodiment, the dovetails 57A, 57B may be configured to provide additional securement of the sensor assembly mount 56 to the bumper mount housing 52.

Turning now to FIGS. 7-11, the figures depict an illustrative embodiment of a materials handling vehicle 5 comprising a vehicle body 10 supported by a steer wheel assembly 20 and a plurality of wheel assemblies 30. The vehicle body 10 includes at least one panel 11, shown in FIGS. 7-11, positioned on a rear of the materials handling vehicle 5. It will be appreciated that the term "rear" as used herein, references a side of the materials handling vehicle 5 opposite the side of the materials handling vehicle comprising the associated materials handling components, e.g., hoist, lift, forklift, etc.

The industrial materials handling vehicle 5 comprises a bumper 40 coupled to the vehicle body 10, and a sensor accommodating bumper mount 150 mounted to the vehicle body 10 and/or the bumper 40. In accordance with some embodiments, the sensor accommodating bumper mount 150 is affixed to the at least one panel 11 and the bumper 40. The vehicle body 10 and the bumper 40 cooperate to define a steer wheel access opening 60. The sensor accommodating bumper mount 150 comprises a bumper mount housing 152, which further comprises a complementary steer wheel access opening 154. In some embodiments, the materials handling vehicle 5 comprises a separate, distinct bumper 40 mounted or otherwise attached to the vehicle body 10. In some embodiments, the materials handling vehicle 5 comprises a bumper 40 that is integrally formed with the vehicle body 10 or the bumper 40 is defied by a bottom portion of the vehicle body 10, proximate the steer wheel assembly 20 and the plurality of wheel assemblies 30. It should be understood, that the materials handling vehicle 5 and vehicle body 10 do not require a distinct, separate bumper 40 and calling the mount 150 a "bumper" mount 150 does not imply the presence of a separate bumper. In embodiments, as shown in FIGS. 7-11, the bumper mount 150 may be directly mounted to the at least one panel 11 of the vehicle body 10.

Figure 7:
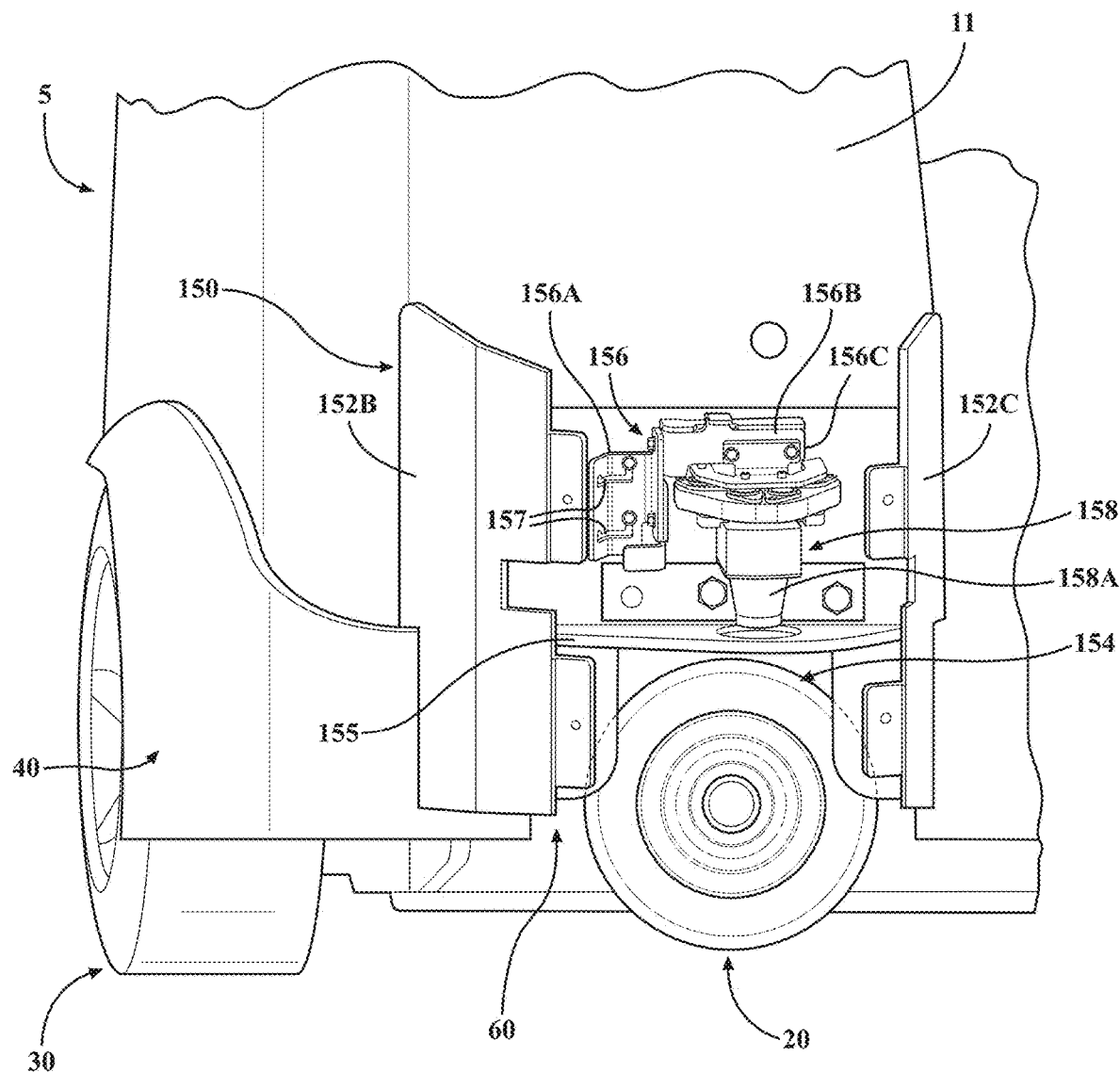
FIG. 7 is an isometric view of a materials handling vehicle with an attached sensor accommodating bumper mount, according to one embodiment of the present disclosure.
Figure 8:
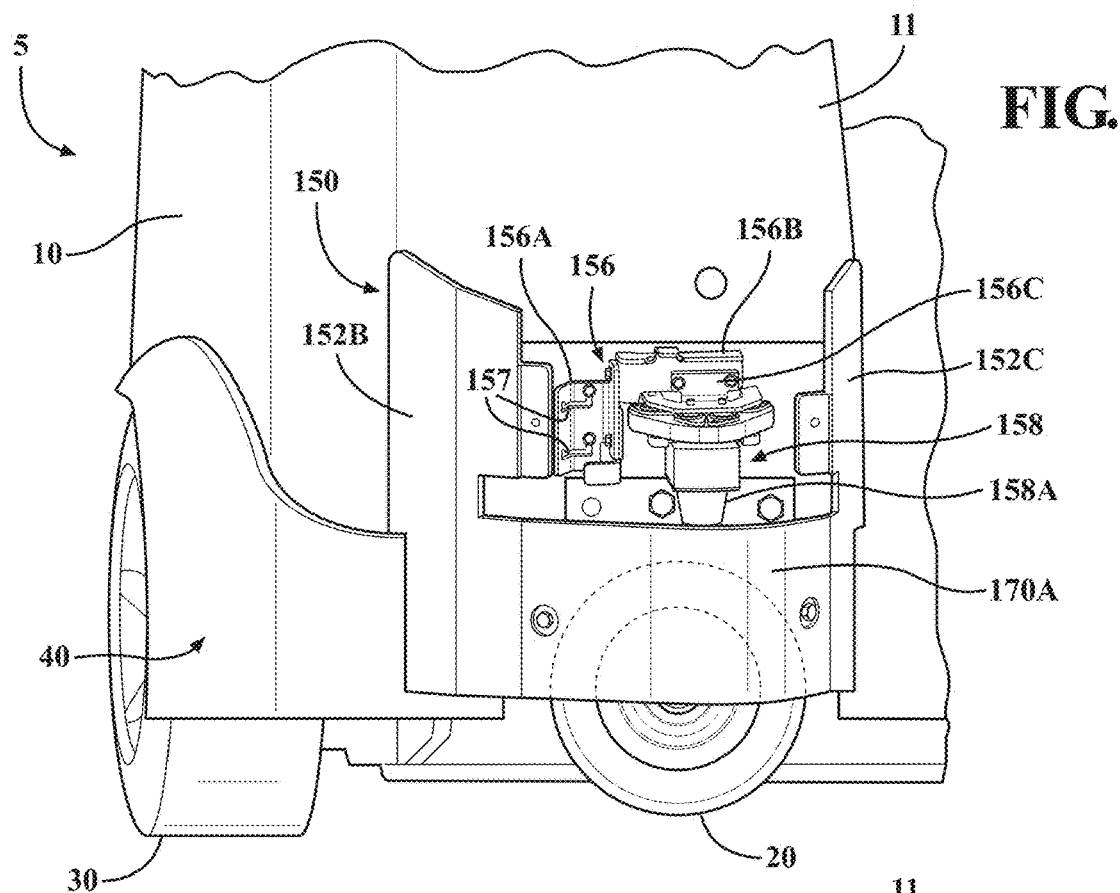
FIG. 8 illustrates a partially exposed view of the attached sensor accommodating bumper mount of FIG. 7.
Figure 9:
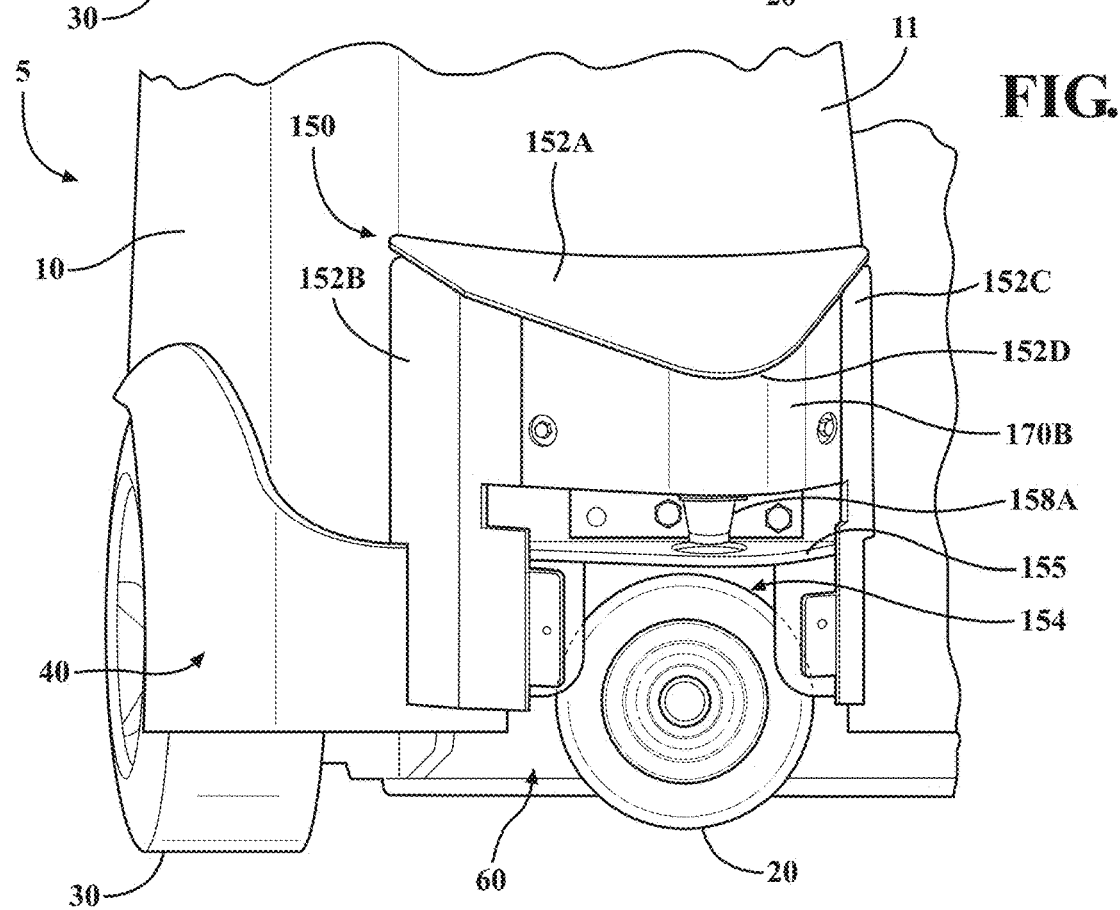
FIG. 9 illustrates a partially exposed view of the attached sensor accommodating bumper mount of FIG. 7.
Figure 10:
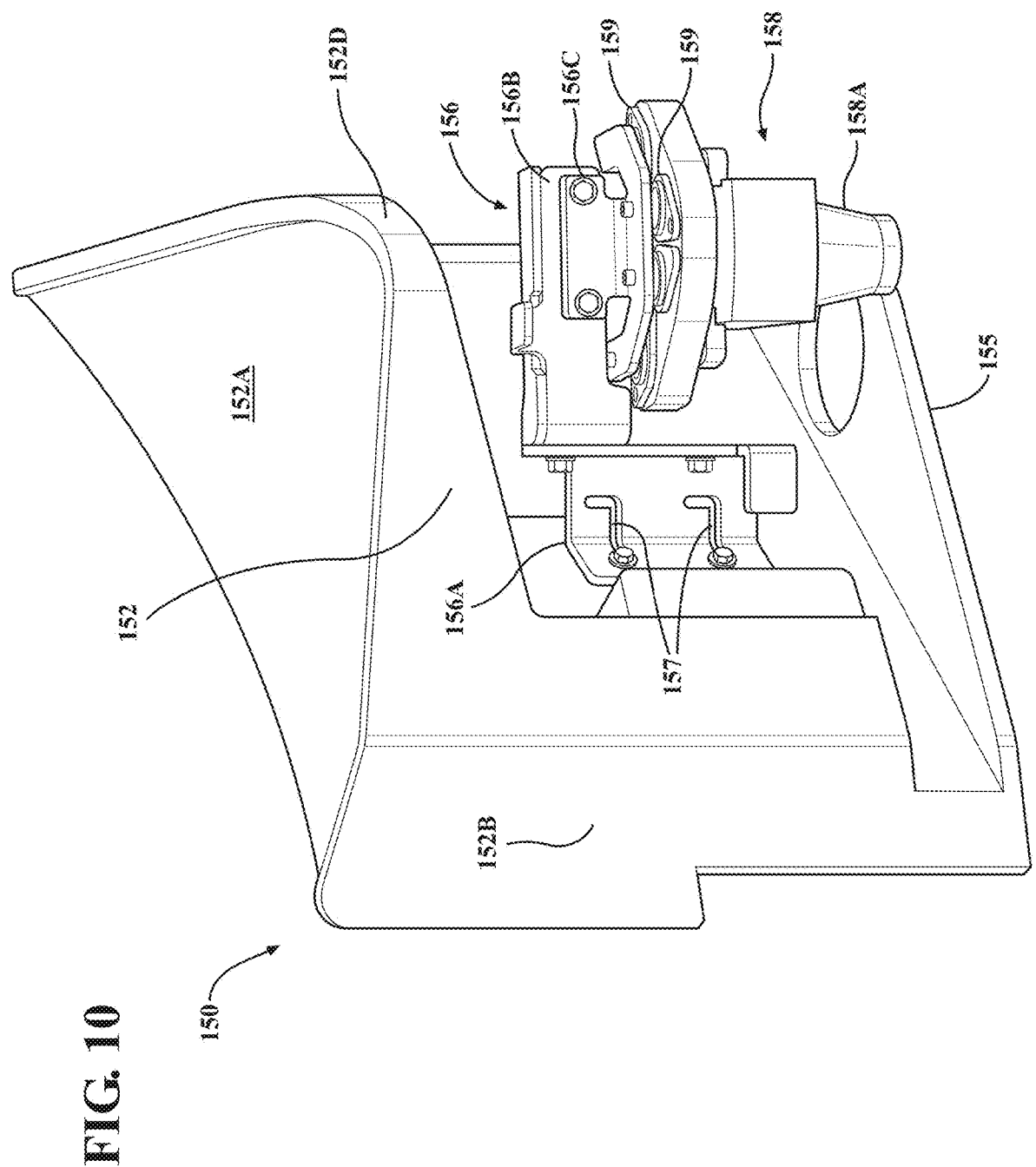
FIG. 10 illustrates a partially exposed view of a sensor assembly mount, according to one embodiment of the present disclosure.
Figure 11:
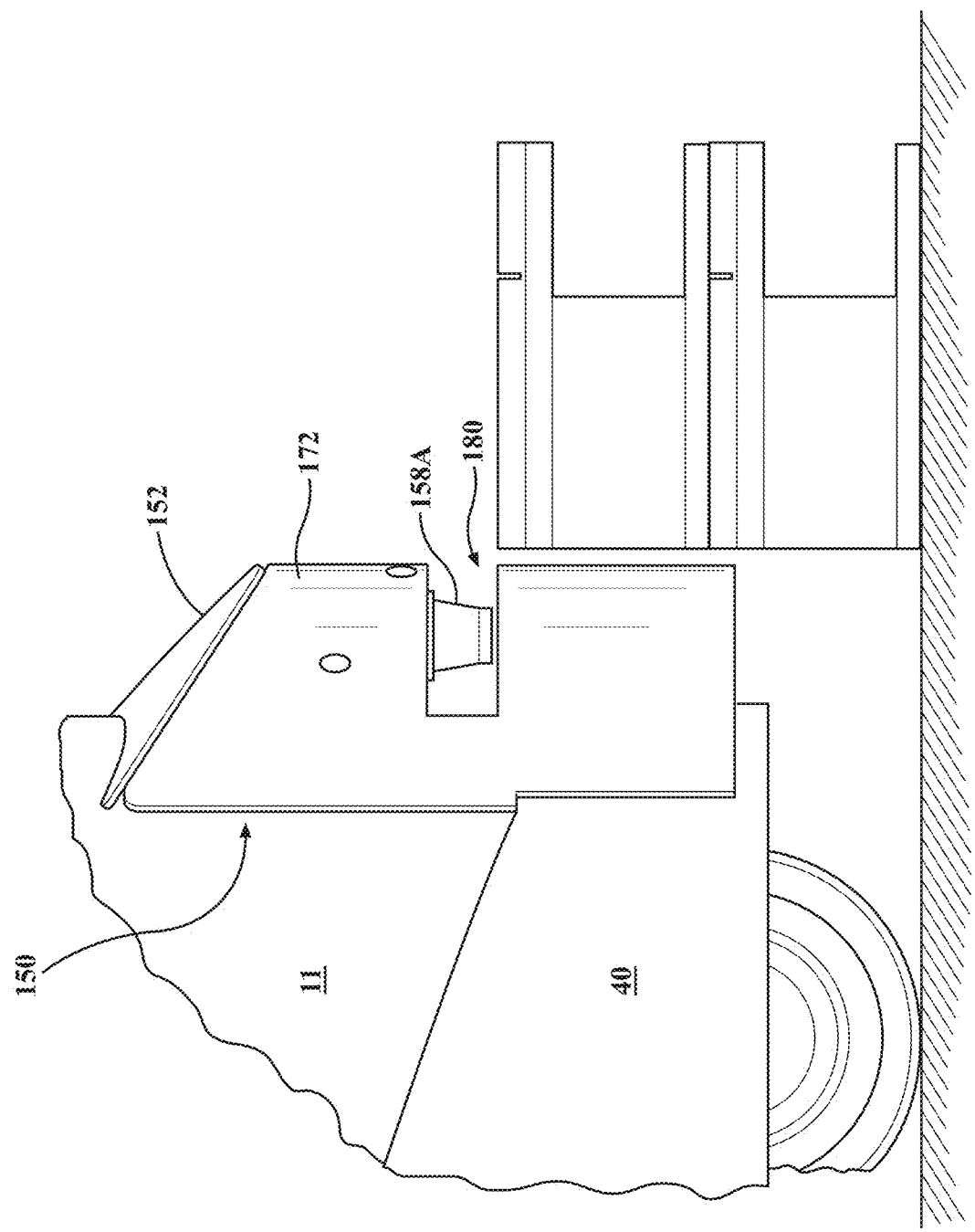
FIG. 11 illustrates the materials handling vehicle with the attached sensor accommodating bumper mount of FIG. 7.

Referring to FIGS. 7-8 and 10, the sensor accommodating bumper mount 150 also comprises a sensor assembly mount 156 that can be movably mounted to the at least one panel 11, the bumper mount housing 152, or both. Furthermore, the sensor accommodating bumper mount 150 comprises a sensor assembly 158 mounted to the sensor assembly mount 156. As shown in FIGS. 7-11, the sensor assembly 158 is positioned at a first distance, e.g., a higher location on the vehicle 5 supported by the wheel assemblies 30 on a horizontal operating surface or plane relative to the sensor assembly 58 illustrated in FIGS. 1-5. That is, the sensor assembly 158 is positioned above the steer wheel access opening 60 and complementary steer wheel access opening 154 relative to the aforementioned horizontal operating surface. FIG. 11 provides an illustrative example of the relative location of the sensor assembly 158 relative to the materials handling vehicle 5, providing a higher field of view, for example enabling detection of stacked pallets, etc. The sensor assembly 158 and the sensor assembly mount 156, as illustrated in FIGS. 7-10, are positioned above the steer wheel access opening 60 and the complementary steer wheel access opening 154 when the sensor assembly mount 156 is mounted to the panel 11, the bumper 40, and/or the bumper mount housing 152. Accordingly, the steer wheel access opening 154 is positioned a second distance above the horizontal operating plane, with the second distance being less than the first distance. Additionally, the sensor accommodating bumper mount 150 provides at least partial access to the steer wheel assembly 20 through the steer wheel access opening 60 and the complementary steer wheel access opening 154 when the sensor assembly mount 56 is mounted.

According to some embodiments disclosed and contemplated herein, the movably mounted sensor assembly mount 156 provides the added benefit of enabling selective access to the steer wheel assembly 20, the steer wheel access opening 60, and the sensor assembly 158 when rotated away from the vehicle body 10, as discussed in greater detail below. If maintenance to the steer wheel assembly 20 or the sensor assembly 158 is required, the sensor assembly mount 156 can be efficiently moved (e.g., rotated outward relative to the vehicle body 10) and/or removed from the accommodating bumper mount 150 to provide at least partial access to the steer wheel assembly 20 for wheel maintenance, the steer wheel access opening 60 for additional maintenance procedures, or access to the sensor assembly 158. When maintenance is completed, the sensor assembly mount 56 can be rotated inward (e.g., toward the vehicle body 10), remounted to the bumper 40, and/or the bumper mount housing 150 proximal to the steer wheel access opening 60 and the complementary steer wheel access opening 154.

As discussed above with respect to FIGS. 1-3, the vehicle body 10 is supported by the steer wheel assembly 20 and the plurality of wheel assemblies 30. Similarly, as shown in FIGS. 7-11, the steer wheel assembly 20 may comprise a single wheel or multiple wheels coupled to a common axle. Accordingly, the steer wheel assembly 20 may be configured to articulate about a fixed point to enable the materials handling vehicle 5 to turn. In some embodiments, the steer wheel assembly may be powered to impart motion to the materials handling vehicle 5. In some embodiments, the plurality of wheel assemblies 30 comprises two wheel assemblies 30 arranged along a common drive axis. The two wheel assemblies 30 may be positioned along a common drive axis on opposite sides of the body 10 of the materials handling vehicle 5. In some embodiments, one or more of the wheel assemblies 30 may be powered in addition to or in place of the steer wheel assembly 20, to impart motion to the materials handling vehicle 5. In one such contemplated embodiment, two of the wheel assemblies 30 are powered wheel assemblies 30. As addressed in greater detail above with respect to FIGS. 1-3, the materials handling vehicle 5 may include one or more motors (not shown) operatively coupled to the steer wheel assembly 20. Further, the materials handling vehicle 5 may also comprise one or more transmission components interfacing the one or more motors with the steer wheel assembly 20. A controller (not shown) may also be utilized, as discussed above, to control the one or more motors, the at least one wheel assembly 30, the steer wheel assembly 20, and various other components, receive input from a user/operator via manual controls, remote controls, or a combination thereof, receive input from a variety of sensors, to control operations of the materials handling vehicle 5, and the like.

As shown in FIGS. 7-11, the sensor accommodating bumper mount 150 comprises the bumper mount housing 152, suitable affixed or mounted to the body panel 11 and/or the bumper 40. In accordance with some embodiments, the bumper mount housing 152 may comprise a deflection cap 152A that is sloped downward relative to the materials handling vehicle 5 supported by the wheel assemblies 30 on a horizontal operating surface. In this manner, objects that might strike the bumper mount housing 152 from above will impact the bumper mount housing 152 with an indirect force and will be deflected away from the materials handling vehicle 5 so as to not damage the sensor assembly 158.

The bumper mount housing 152 further comprises opposing housing side walls 152B, 152C that extend substantially perpendicularly outward from the panel 11 in a sloped manner to define an outwardly contracting housing volume, wherein the opposing side walls 152B, 152C slope towards one another to terminate in a rounded nose 152D. In this manner, objects that forcibly engage the bumper mount housing 152 from a lateral direction will impact the bumper mount housing 152 with indirect force and will be deflected away from the vehicle 5 and sensor assembly 158. In accordance with some embodiments, the two sidewalls 152B, 152C of the bumper mount housing 152 may be positioned opposite one another about the steer wheel access opening 60 so that a portion of the outwardly contracting housing volume is positioned over the steer wheel access opening 60.

According to some embodiments contemplated and disclosed herein, the bumper mount housing 152 comprises mounting hardware passages that are aligned with complementary mounting hardware passages in the panel 11, the vehicle body 10 and/or the bumper mount housing 152 comprises mounting hardware that extends through the mounting hardware passages of the bumper mount housing 152 and extends through or engages the complementary mounting hardware passages of the vehicle body 10 to secure or mount the bumper mount housing 152 to the vehicle body 10. It is noted that the term "removably" is used herein to describe vehicle components that may be removed and reinstalled repeatedly with, for example, mounting hardware such as bolts, nuts, machine screws, and other known or yet to be developed mounting hardware.

Referring now to FIGS. 7-8 and 10, the bumper mount housing 152 may comprise a divider 155, extending perpendicularly away from the body panel 11 when the bumper mount housing 152 is mounted thereto. In accordance with some embodiments, the divider 155 may include a cutout, positioned proximal to the sensor assembly 158, enabling accommodation of one or more components of the sensor assembly 158 during mounting, movement of the sensing component from vibration caused by operations of the materials handling vehicle 5, and/or variations in dimensions of the sensor 158A. As shown in the accompanying figures, the sensor assembly mount 156 comprises a sensor assembly angle bracket 156A, a sensor assembly mounting plate 156B removably coupled to the sensor assembly angle bracket 156A, and a sensor assembly mounting hardware 156C removably securing the sensor assembly 158 to the sensor assembly mounting plate 156B.

In accordance with some embodiments, the sensor assembly 156 may be mounted to the bumper mount housing 152 via the angle bracket 156A. The sensor assembly angle bracket 156A may comprise one or more slotted channels or guides 157 that are aligned with complementary mounting hardware passages in the bumper mount housing 152 and mounting hardware that extends through the one or more slotted channels or guides 157 and extends through or engages the complementary mounting hardware passages of the bumper mount housing 152 to movably secure the sensor assembly mount 156 to the bumper mount housing 152.

As illustrated in FIGS. 7-11, the angle bracket 156A may enable the sensor assembly mount 156 and the sensor assembly 158 to move relative to the bumper mount housing 152 about a fixed point so that the sensor assembly mount 156, the sensor assembly 158, or both are provided additional clearance from the bumper mount housing 152 to facilitate easier access to the sensor assembly 158, enable access to the bumper mount housing 152 and/or the steer wheel access opening positioned behind the sensor assembly mount 156. In embodiments, the angle bracket 156A is configured to enable the sensor assembly mount 156 to swing out horizontally about the attachment point. Alternatively, the angle bracket 156A may be configured to enable the sensor assembly mount 156 to swing out vertically about the attachment point.

As noted above, the angle bracket 156A comprises an angled plate defining two movement channels or guides 157, wherein the angle bracket 156A is removably coupled to the sensor assembly mounting plate 156B at a first side and the angle bracket 156A is selectively coupled to bumper mount housing 152 within the movement channels or guides 157 at a second side via an attachment screw positioned within each movement channel or guide 157, and wherein loosening each attachment screw enables the angle bracket 156A to move, e.g., slide, according to the dimensions of the movement channels or guides 157. For example, bolts securing the angle bracket 156A to the panel 11 or bumper mount housing 152 may be loosened (e.g., unscrewed), wherein the heads of such bolts no longer frictionally engage and secure the angle bracket 156A in position. The angle bracket 156A and corresponding sensor assembly 158 may then be moved, e.g., slide, along the threaded portions of the bolts within the movement channels or guides 157, such that the angle of the angle bracket 156A cooperates to rotate the sensor assembly 158 outward relative to the panel 11 or bumper mount housing 152, as shown particularly in FIG. 10.

In accordance with some embodiments, the angle bracket 156A may comprise a fixed structure without moveable joints. The fixed structure of the angle bracket 156A provides for movement of the sensor assembly 158 while reducing the negative effects associated with moveable joints, such as reduced mechanical stability and increased vibration due to movement at the joint. FIG. 10, in particular, provides an illustrative view of the sensor assembly mount 156 rotated outward relative to the panel 11 of the vehicle body 5 via the movement channels or guides 157.

In accordance with some embodiments disclosed and contemplated herein, the sensor accommodating bumper mount 150 further comprises the sensor assembly 158. The sensor assembly 158 is removably mounted to the sensor assembly mounting plate 156B via sensor assembly mounting hardware 156C. The sensor assembly mounting plate 156B comprises mounting hardware passages that are aligned with complementary mounting hardware passages in the sensor assembly mounting hardware 156C; and the sensor assembly mounting hardware 156C extends through mounting hardware passages of the sensor assembly mounting plate 156B to removably secure the sensor assembly 158 to the sensor assembly mounting plate 156B. It is noted that the term "removably" is used herein to describe vehicle components that may be removed and reinstalled repeatedly with, for example, mounting hardware such as bolts, nuts, machine screws, and other known or yet to be developed mounting hardware.

In embodiments the sensor assembly mount 156 further comprises one or more adjustment features to selectively position the sensor assembly relative to the sensor assembly mount. Each adjustment feature may independently control the rotation of the sensor assembly about a principal axis comprising a pitch axis, a roll axis, and a yaw axis. In embodiments, a single adjustment feature may control the rotation of the sensor assembly about more than one principal axes. Each adjustment feature comprises one or more adjustable screws or tabs positioned on the sensor assembly mount 156 to rotate the sensor assembly 158 about one or more principal axes. The adjustment features, may be positioned on an exterior portion of the sensor assembly 158 to enable a user to manually control the positioning of the sensor assembly 158 via manual adjustment such as the tightening/loosening of a screw or the manual adjustment of a tab. In embodiments, each of the adjustment features may be controlled using a motor such as a servo motor, a stepper motor, or the like. Control of the adjustment features using a motor may enable the user to control the position of the sensor assembly 158 remotely and/or enable a processor to automatically make adjustments to the positioning of the sensor assembly during operation.

As shown in FIGS. 7-8 and 10, the sensor assembly mount 156 may include one or more damping mechanisms 159 positioned between the senor mounting hardware 156C and the sensor assembly 158. In accordance with some embodiments, the damping mechanisms 159 may be constructed of a suitable polymer-based, rubber-based, or any other suitable material configured to reduce vibrations and/or oscillations occurring during operations of the materials handling vehicle 5. The one or more damping mechanisms 159 may comprise one or more of helical springs, leaf springs, isolation pads, plungers, or any other equivalent mechanism capable of reducing vibration imparted to the sensor assembly 158 at the attachment point between the sensor assembly 158 and the sensor assembly mount 156C. In such embodiments, damping of vibrations imparted to the sensor assembly 158 can reduce movement of the sensor assembly 158 and increase resolution of the sensing portion 158A. FIGS. 7-8 and 10 illustrate one example implementation of the damping mechanism 159, wherein the damping mechanisms 159 comprise a substantially planar upper and lower surface, and extend around pillars or posts coupling the sensor assembly 158 to the sensor mounting hardware 156C.

In some embodiments, the sensor assembly 158 is positioned below the sensor assembly mount 156C and a plurality of damping mechanisms 159 are provided to contact an upper surface of the sensor assembly 158 and to contact a lower surface of the sensor assembly mount 156C. In embodiments, the sensor assembly mount 156C comprises between one and twelve independent damping mechanisms 159 positioned between the sensor assembly 158 and the sensor assembly mount 156C. In an embodiment, the sensor assembly mount 156C comprises four independent damping mechanisms 159 positioned between the sensor assembly 158 and the sensor assembly mount 156C. The one or more damping mechanisms 159 may be capable of substantially isolating the sensor assembly 158 from vibrations at impacts with an applied force of less than or equal to 80G, less than or equal to 60G, less than or equal to 40G, or even less than or equal to 20G. In an embodiment, the one or more damping mechanisms 159 are capable of substantially isolating the sensor assembly 158 from vibrations at an impact of less than or equal to 40G. As used herein, the term "substantially isolating" means that less than or equal to 10% of the applied vibrational/oscillating forces are transferred through the damping mechanism 159.

In embodiments, the sensor assembly 158 comprises a LiDAR sensor. However, although the concepts of the present disclosure are discussed with primary reference to a LiDAR sensor, it is contemplated that the sensor accommodating bumper mount 150 may comprise any of a variety of conventional or yet-to-be developed sensors including, for example, non-LiDAR laser scanners, vision systems, UWB transceivers, ultrasonic sensors, or the like.

As shown in FIGS. 8 and 9, the sensor accommodating bumper mount 150 may include one or more sensor assembly covers 170A, 170B mounted to the bumper mount housing 152. In some embodiments, the sensor assembly covers 170A, 170B may be removably mounted to the bumper mount housing 152 to enable a user to selectively access the sensor assembly. The one or more sensor assembly covers 170A, 170B may extend outwardly from the bumper mount housing 152 in a corresponding sloped manner to follow the contour of the bumper mount housing 152. The one or more sensor assembly covers 170A, 170B are positioned relative to one another such that the one or more sensor assembly covers 170A, 170B cooperate to define a sensor window 180 that is aligned with a sensing portion 158A of the sensor assembly 158. In embodiments, the sensor assembly 158 comprises a LiDAR sensor. In embodiments, the bumper mount housing 152 may be coupled with the sensor assembly mount 156, so that the deflection cap 152A, the housing side walls 152B, 152C, and the one or more sensor assembly covers 170A, 170B collectively define an interior region to at least partially enclosing the sensor assembly 158.

Referring particularly to FIG. 11, there is shown a side view of the bumper mount housing 152 in accordance with some embodiments. As illustrated in FIG. 11, the bumper mount housing 152 is affixed or mounted to the panel 11 and/or bumper 40 of the materials handling vehicle 5. In the embodiment of FIG. 11, as briefly discussed above, the sensor assembly 158 is positioned a higher location on the vehicle 5 relative to the materials handling vehicle 5 supported by the wheel assemblies 30 on a horizontal operating surface. FIG. 11 provides an illustrative example of the relative location of the sensor assembly 158 relative to the materials handling vehicle 5, providing a higher field of view, enabling detection of stacked pallets, etc. As shown in FIG. 11, the bumper mount housing 152 includes a single-piece sensor assembly cover 172, in place of the multiple sensor assembly covers 170A, 170B discussed above with respect to FIGS. 8 and 9. The single-piece sensor assembly cover 172 includes a sensor window 180, defining a field of view that is between approximately 170 degrees and approximately 210 degrees in a horizontal plane, with the materials handling vehicle 5 supported by the wheel assemblies 30 on a horizontal operating surface.

Figure 12:
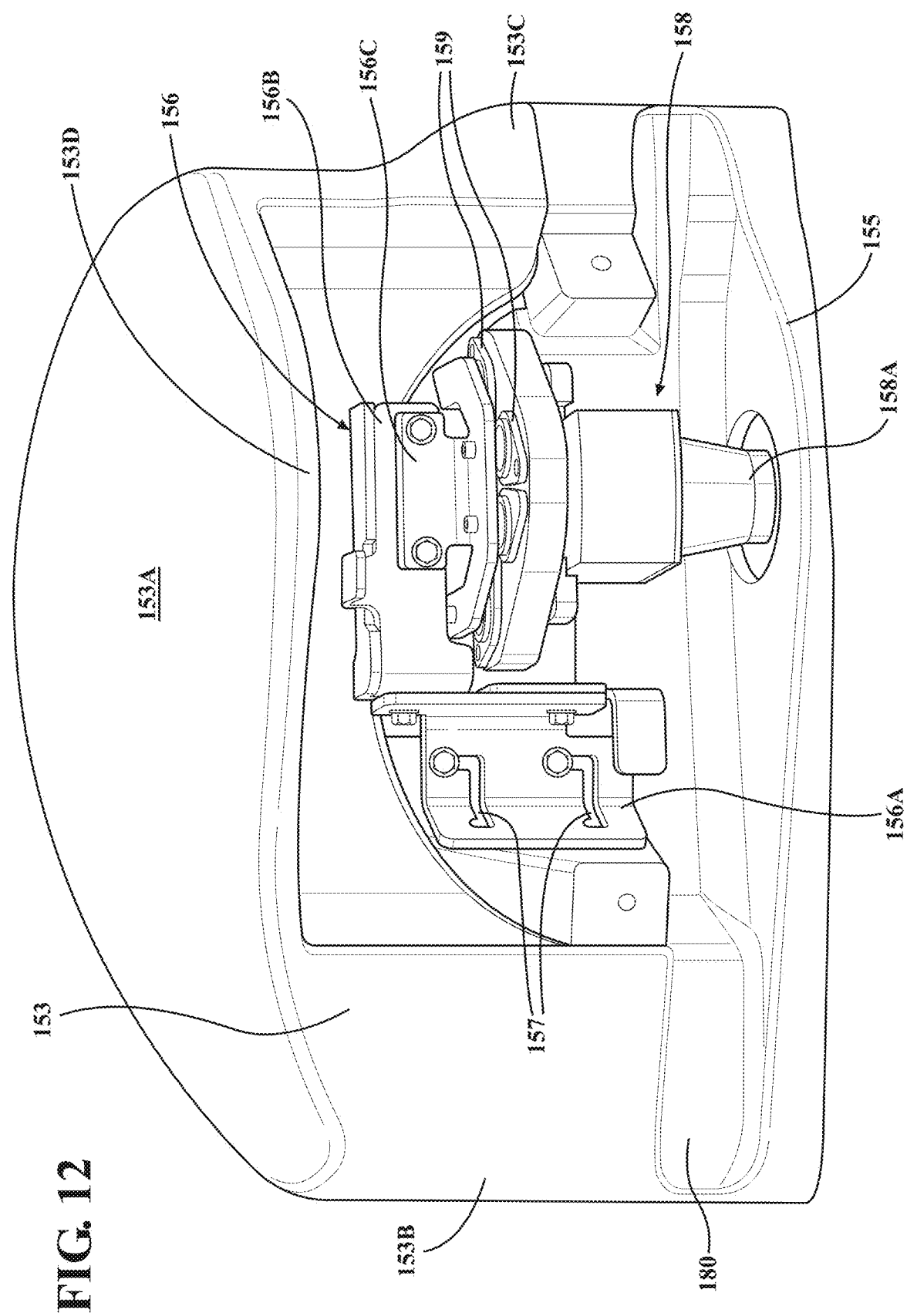
FIG. 12 illustrates a partially exposed view of a sensor accommodating bumper mount, according to one embodiment of the present disclosure.

Referring now to FIG. 12, there is shown a bumper mount housing 153 in accordance with some embodiments disclosed and contemplated herein. As illustrated in FIG. 12, the bumper mount housing 153 may comprise a deflection cap 153A that is sloped downward relative to the materials handling vehicle 5 supported by the wheel assemblies 30 on a horizontal operating surface. In this manner, objects that might strike the bumper mount housing 153 from above will impact the bumper mount housing 153 with an indirect force and will be deflected away from the materials handling vehicle 5 so as to not damage the sensor assembly 158.

The bumper mount housing 153 shown in FIG. 12 further comprises opposing housing side walls 153B, 153C that extend radially outward from the panel 11 in a curved manner to define an outwardly contracting housing volume, wherein the opposing side walls 153B, 153C curve towards one another to terminate in a rounded nose 153D. In this manner, objects that forcibly engage the bumper mount housing 153 from a lateral direction will impact the bumper mount housing 153 with indirect force and will be deflected away from the vehicle 5 and sensor assembly 158. In accordance with some embodiments, the two sidewalls 153B, 153C of the bumper mount housing 153 may be positioned opposite one another about the steer wheel access opening 60 so that a portion of the outwardly contracting housing volume is positioned over the steer wheel access opening 60.

The bumper mount housing 153 shown in FIG. 12 provides a rounded profile relative to the bumper mount housings 52, 152 described above. Similar to the bumper mount housing 152, the bumper mount housing 153 comprises a divider 155 extending perpendicularly away from the body panel 11 when the bumper mount housing 152 is mounted thereto. In accordance with some embodiments, the divider 155 may include a cutout positioned proximal to the sensor assembly 158, enabling accommodation of one or more components of the sensor assembly 158 during mounting, movement of the sensing component from vibrations caused by operations of the materials handling vehicle 5, and/or variations in dimensions of the sensor 158A. As shown in FIG. 12, the sensor assembly mount 156 comprises a sensor assembly angle bracket 156A, a sensor assembly mounting plate 156B removably coupled to the sensor assembly angle bracket 156A, and a sensor assembly mounting hardware 156C removably securing the sensor assembly 158 to the sensor assembly mounting plate 156B.

As shown in FIG. 12, the sensor assembly 156 may be mounted to the bumper mount housing 153 via the angle bracket 156A. As described above, the sensor assembly angle bracket 156A may comprise one or more slotted channels or guides 157 that are aligned with complementary mounting hardware passages in the bumper mount housing 153 and mounting hardware that extends through the one or more slotted channels or guides 157 and extends through or engages the complementary mounting hardware passages of the bumper mount housing 153 to movably secure the sensor assembly mount 156 to the bumper mount housing 153.

Furthermore, the angle bracket 156A may be configured to enable the sensor assembly mount 156 and the attached sensor assembly 158 to move relative to the bumper mount housing 153 about a fixed point so that the sensor assembly mount 156, the sensor assembly 158, or both are provided additional clearance from the bumper mount housing 153 to facilitate easier access to the sensor assembly 158, enable access to the bumper mount housing 153 and/or the steer wheel access opening 60 positioned behind the sensor assembly mount 156.

As described above, the angle bracket 156A of FIG. 12 includes one or more movement channels or guides 157, such that the angle bracket 156A is removably coupled to the sensor assembly mounting plate 156B at a first side and the angle bracket 156A is movably coupled to bumper mount housing 153 within the movement channels or guides 157 at a second side via an attachment screw or bolt positioned within each movement channel or guide 157. In accordance with some embodiments, loosening each attachment screw enables the angle bracket 156A to move, e.g., slide, according to the dimensions of the movement channels or guides 157. For example, bolts securing the angle bracket 156A to the panel 11 or bumper mount housing 153 may be loosened (e.g., unscrewed), wherein the heads of such bolts no longer frictionally engage and secure the angle bracket 156A in position. The angle bracket 156A and corresponding sensor assembly 158 may then be moved, e.g., slide, along the threaded portions of the bolts within the movement channels or guides 157, such that the angle of the angle bracket 156A cooperates to rotate the sensor assembly 158 outward relative to the panel 11 or bumper mount housing 153.

As shown in FIG. 12, the sensor assembly 158 may be removably mounted to the sensor assembly mounting plate 156B via sensor assembly mounting hardware 156C. The sensor assembly mounting plate 156B comprises mounting hardware passages that are aligned with complementary mounting hardware passages in the sensor assembly mounting hardware 156C; and the sensor assembly mounting hardware 156C extends through mounting hardware passages of the sensor assembly mounting plate 156B to removably secure the sensor assembly 158 to the sensor assembly mounting plate 156B. The sensor assembly mount 156, as discussed above, may comprise one or more adjustment features configured to selectively position the sensor assembly 158 relative to the sensor assembly mount 156.

In accordance with some embodiments, one or more damping mechanisms 159 may be positioned between the sensor mounting hardware 165C and the sensor assembly 158. As noted above, the one or more damping mechanisms 159 may comprise may comprise one or more of helical springs, leaf springs, isolation pads, plungers, polymer-based pads, rubber-based pads, or any other equivalent mechanism capable of reducing vibration imparted to the sensor assembly 158 at the attachment point between the sensor assembly 158 and the sensor assembly mount 156C. According to some embodiments, the one or more damping mechanisms 159 comprise a substantially planar upper and lower surface, and extend around pillars or posts coupling the sensor assembly 158 to the sensor mounting hardware 156C.

In some embodiments contemplated and disclosed herein, the sensor assembly 158 comprises a LiDAR sensor. Other embodiments contemplated and disclosed herein may utilize any variety of conventional or yet-to-be developed sensors including, for example, non-LiDAR laser scanners, vision systems, UWB transceivers, ultrasonic sensors, or the like.

Although not illustrated in FIG. 12, it is contemplated that the bumper mount housing 153 may include one or more sensor assembly covers, similar to those shown in FIGS. 8 and 9. Alternatively, a single sensor assembly 172 cover may be utilized to protect the sensor assembly 158, as shown in FIG. 11. Accordingly, such sensor assembly covers 170A, 170B may be removably mounted to the bumper mount housing 153 to enable a user to selectively access the sensor assembly, and may may extend outwardly from the bumper mount housing 153 in a corresponding curved manner to follow the contour of the deflection cap 153A. Further, such one or more sensor assembly covers may be positioned relative to one another such that the one or more sensor assembly covers cooperate to define a sensor window 180 that is aligned with the sensing portion 158A of the sensor assembly 158. In embodiments, the bumper mount housing 153 may be coupled with the sensor assembly mount 156, so that the deflection cap 153A, the housing side walls 153B, 153C, and the one or more sensor assembly covers collectively define an interior region to at least partially enclosing the sensor assembly 158.

It is contemplated herein that the sensor assembly 156 illustrated in FIGS. 7-12 may also be used to mount the sensor 58 with respect to the embodiments disclosed above in FIGS. 1-6. That is, the sensor assembly 156 may be mounted to the bumper mount housing 52 via the angle bracket 156A. As described above, the sensor assembly angle bracket 156A may comprise one or more slotted channels or guides 157 that are aligned with complementary mounting hardware passages in the bumper mount housing 52 and mounting hardware that extends through the one or more slotted channels or guides 157 and extends through or engages the complementary mounting hardware passages of the bumper mount housing 52 to movably secure the sensor assembly mount 156 to the bumper mount housing 52.

Furthermore, the angle bracket 156A may be configured to enable the sensor assembly mount 156 and the attached sensor assembly 58 to move relative to the bumper mount housing 52 about a fixed point so that the sensor assembly mount 156, the sensor assembly 58, or both are provided additional clearance from the bumper mount housing 52 to facilitate easier access to the sensor assembly 58, enable access to the bumper mount housing 52 and/or the steer wheel access opening 60 positioned behind the sensor assembly mount 156.

As described above, the angle bracket 156A may be removably coupled to the sensor assembly mounting plate 156B at a first side and the angle bracket 156A is movably coupled to bumper mount housing 52 within the movement channels or guides 157 at a second side via an attachment screw or bolt positioned within each movement channel or guide 157. In accordance with some embodiments, loosening each attachment screw enables the angle bracket 156A to move, e.g., slide, according to the dimensions of the movement channels or guides 157. For example, bolts securing the angle bracket 156A to the bumper and/or bumper mount housing 52 may be loosened (e.g., unscrewed), wherein the heads of such bolts no longer frictionally engage and secure the angle bracket 156A in position. The angle bracket 156A and corresponding sensor assembly 58 may then be moved, e.g., slide, along the threaded portions of the bolts within the movement channels or guides 157, such that the angle of the angle bracket 156A cooperates to rotate the sensor assembly 58 outward relative to the panel 11 or bumper mount housing 52.

It is also noted that recitations herein of "at least one" component, element, etc., should not be used to create an inference that the alternative use of the articles "a" or "an" should be limited to a single component, element, etc. For example, "a sensor assembly" may refer to a plurality of sensor assemblies within the sensor accommodating bumper mount.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An industrial materials handling vehicle comprising a vehicle body supported by a steer wheel assembly and a plurality of wheel assemblies, a bumper coupled to the vehicle body, and a sensor accommodating bumper mount mounted to the vehicle body, the bumper, or both, wherein the vehicle body and the bumper cooperate to define a steer wheel access opening and the sensor accommodating bumper mount comprises:
   a bumper mount housing comprising a complementary steer wheel access opening;
   a sensor assembly mount removably mounted to the bumper, the bumper mount housing, or both; and
   a sensor assembly mounted to the sensor assembly mount, wherein the sensor assembly and the sensor assembly mount at least partially obstruct the steer wheel access opening and the complementary steer wheel access opening when the sensor assembly mount is mounted to the bumper, the bumper mount housing, or both, and provide at least partial access to the steer wheel assembly through the steer wheel access opening and the complementary steer wheel access opening when the sensor assembly mount is unmounted.

2. The industrial materials handling vehicle of claim 1, wherein the steer wheel access opening and the complementary steer wheel access opening define an unobstructed path to a majority of a wheel face of the steer wheel assembly upon removal of the sensor assembly mount.

3. The industrial materials handling vehicle of claim 1, wherein the sensor assembly and the sensor assembly mount form an integrated sensor assembly unit that are removable together from the materials handling vehicle by removing the sensor assembly mount.

4. The industrial materials handling vehicle of claim 1, wherein the sensor assembly mount comprises:
   a sensor assembly mounting base;
   a sensor assembly mounting plate mounted to the sensor assembly mounting base; and
   sensor assembly mounting hardware removably securing the sensor assembly to the sensor assembly mounting plate.

5. The industrial materials handling vehicle of claim 4, wherein the sensor assembly mount further comprises a supplemental bumper plate mounted to the sensor assembly mounting base.

6. The industrial materials handling vehicle of claim 5, wherein the supplemental bumper plate extends outwardly from the sensor assembly mounting plate in a corresponding sloped manner to follow the contour of the bumper mount housing.

7. The industrial materials handling vehicle of claim 1, wherein the materials handling vehicle further comprises a sensor assembly cover mounted to the bumper mount housing.

8. The industrial materials handling vehicle of claim 1, wherein the materials handling vehicle further comprises:
   a removable sensor assembly cover mounted to the bumper mount housing; and
   the sensor assembly mount comprises a supplemental bumper plate, wherein the sensor assembly cover and the supplemental bumper plate cooperate to define a sensor window aligned with a sensing portion of the sensor assembly.

9. The industrial materials handling vehicle of claim 8, wherein the sensor assembly comprises a LiDAR sensor.

10. The industrial materials handling vehicle of claim 8, wherein the sensor window defines a field of view that is greater than or equal to 170 degrees and less than or equal to 210 degrees in a horizontal plane, with the industrial materials handling vehicle supported by the wheel assemblies on a horizontal operating surface.

11. The industrial materials handling vehicle of claim 1, wherein the bumper mount housing comprises a deflection cap that is sloped downwardly with the industrial materials handling vehicle supported by the wheel assemblies on a horizontal operating surface.

12. The industrial materials handling vehicle of claim 1, wherein the bumper mount housing comprises side walls that extend outwardly from the vehicle body in a sloped manner to define an outwardly contracting housing volume.

13. The industrial materials handling vehicle of claim 12, wherein the sensor assembly mount comprises a supplemental bumper plate that extends outwardly relative to the vehicle body in alignment with the bumper mount housing side walls.

14. The industrial materials handling vehicle of claim 1, wherein the bumper mount housing is mounted to the vehicle body and the sensor assembly mount is mounted to the bumper mount housing.

15. The industrial materials handling vehicle of claim 14, wherein a sensor assembly mounting plate of the sensor assembly mount is mounted to the bumper mount housing.

16. The industrial materials handling vehicle of claim 1, wherein:
the sensor assembly mount comprises mounting hardware passages that are aligned with complementary mounting hardware passages in the bumper mount housing; and
the sensor assembly mount comprises mounting hardware that extends through mounting hardware passages of the sensor assembly mount and extends through or engages the complementary mounting hardware passages of the bumper mount housing to removably secure the sensor assembly mount to the bumper mount housing.

17. The industrial materials handling vehicle of claim 1, wherein the industrial materials handling vehicle further comprises:
a removable sensor assembly cover mounted to the bumper mount housing; and
the sensor assembly mount comprising:
a sensor assembly mounting base;
a sensor assembly mounting plate mounted to the sensor assembly mounting base;
sensor assembly mounting hardware removably securing the sensor assembly to the sensor assembly mounting plate; and
a supplemental bumper plate mounted to the sensor assembly mounting base;
wherein the sensor assembly cover and the supplemental bumper plate cooperate to define a sensor window aligned with a sensing portion of the sensor assembly.

18. The industrial materials handling vehicle of claim 17, wherein the steer wheel access opening and the complementary steer wheel access opening define an unobstructed path to a majority of a wheel face of the steer wheel assembly upon removal of the sensor assembly mount.

19. The industrial materials handling vehicle of claim 17, wherein the sensor assembly comprises a LiDAR sensor and the sensor window defines a field of view that is greater than or equal to 170 degrees and less than or equal to 210 degrees in a horizontal plane, with the industrial materials handling vehicle supported by the wheel assemblies on a horizontal operating surface.

20. The industrial materials handling vehicle of claim 1, wherein the sensor assembly mount further comprises one or more adjustment features to selectively position the sensor assembly relative to the sensor assembly mount.

21. The industrial materials handling vehicle of claim 20, wherein the one or more adjustment features independently control the rotation of the sensor assembly about a principal axis comprising a pitch axis, a roll axis, or a yaw axis.

22. The industrial materials handling vehicle of claim 21, wherein the one or more adjustment features comprise one or more adjustable screws or tabs positioned on the sensor assembly mount to rotate the sensor assembly about one or more principal axes.

23. The industrial materials handling vehicle of claim 1, wherein the sensor assembly mount comprises one more damping mechanisms positioned between the sensor assembly and the sensor assembly mount.

24. The industrial materials handling vehicle of claim 23, wherein a plurality of damping mechanisms are positioned between the sensor assembly and the sensor assembly mount, wherein the plurality of damping mechanisms contact an upper surface of the sensor assembly and contact a lower surface of the sensor assembly mount.

25. The industrial materials handling vehicle of claim 23, wherein the one or more damping mechanisms comprises one or more of helical springs, leaf springs, isolation pads, and plungers.

26. The industrial materials handling vehicle of claim 23, wherein the sensor assembly mount comprises four independent damping mechanisms positioned between the sensor assembly and the sensor assembly mount.

27. The industrial materials handling vehicle of claim 23, wherein the one or more damping mechanisms are capable of substantially isolating the sensor assembly from vibrations at an impact of less than or equal to 40G.

28. The industrial materials handling vehicle of claim 1, wherein the sensor assembly mount further comprises an angle bracket coupling the sensor assembly mount to the bumper mount housing.

29. The industrial materials handling vehicle of claim 28, wherein the angle bracket is configured to enable the sensor assembly mount to swing out horizontally about an attachment point.

30. The industrial materials handling vehicle of claim 28, wherein the angle bracket is configured to enable the sensor assembly mount to swing out vertically about an attachment point.

31. The industrial materials handling vehicle of claim 28, wherein the angle bracket further comprises at least one movement channel, wherein the angle bracket is fixed to the sensor assembly mount at a first side and the angle bracket is selectively coupled to the bumper mount housing within the at least one movement channel at a second side via at least one attachment screw positioned within the at least one movement channel, and wherein loosening the at least one attachment screw enables the angle bracket to move according to dimensions of the at least one movement channel.

32. The industrial materials handling vehicle of claim 28, wherein the angle bracket is a fixed structure without moveable joints.

33. An industrial materials handling vehicle comprising a vehicle body supported by a plurality of wheel assemblies, and a sensor accommodating bumper mount mounted to the vehicle body, wherein the vehicle body defines a wheel access opening and the sensor accommodating bumper mount comprises:
a bumper mount housing comprising a complementary wheel access opening;
a sensor assembly mount removably mounted to the vehicle body, the bumper mount housing, or both; and
a sensor assembly mounted to the sensor assembly mount, wherein the sensor assembly and the sensor assembly mount at least partially obstruct the wheel access opening and the complementary wheel access opening when the sensor assembly mount is mounted to the vehicle body, the bumper mount housing, or both, and provide at least partial access to the steer wheel assembly through the wheel access opening and the complementary wheel access opening when the sensor assembly mount is unmounted.

* * * * *